(12) United States Patent
Kim et al.

(10) Patent No.: US 11,565,710 B2
(45) Date of Patent: Jan. 31, 2023

(54) DEVICE FOR AND METHOD OF CONTROLLING TRAVELING CHARACTERISTIC OF VEHICLE

(71) Applicants: Hyundai Motor Company, Seoul (KR); Kia Motors Corporation, Seoul (KR)

(72) Inventors: Sung Jae Kim, Suwon-si (KR); Jeong Soo Eo, Hwaseong-si (KR); Ji Won Oh, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 449 days.

(21) Appl. No.: 16/690,927

(22) Filed: Nov. 21, 2019

(65) Prior Publication Data
US 2020/0216087 A1    Jul. 9, 2020

(30) Foreign Application Priority Data

Jan. 3, 2019  (KR) .......................... 10-2019-0000526

(51) Int. Cl.
*B60W 50/00*  (2006.01)
*B60W 50/08*  (2020.01)
*B60W 10/26*  (2006.01)
*B60W 10/08*  (2006.01)

(52) U.S. Cl.
CPC .......... *B60W 50/085* (2013.01); *B60W 10/08* (2013.01); *B60W 10/26* (2013.01); *B60W 2050/0064* (2013.01); *B60W 2510/083* (2013.01); *B60W 2556/45* (2020.02)

(58) Field of Classification Search
None
See application file for complete search history.

(56) References Cited

U.S. PATENT DOCUMENTS

| | | | |
|---|---|---|---|
| 2009/0021385 A1* | 1/2009 | Kelty | B60L 53/64 340/660 |
| 2012/0143413 A1* | 6/2012 | Cho | B60L 15/2045 701/22 |
| 2019/0126939 A1* | 5/2019 | Zhao | B60W 50/14 |
| 2019/0276036 A1* | 9/2019 | Noguchi | B60W 40/02 |

\* cited by examiner

*Primary Examiner* — Truc M Do
(74) *Attorney, Agent, or Firm* — Lempia Summerfield Katz LLC

(57) ABSTRACT

Disclosed are a device and method for controlling a traveling characteristic of a vehicle. The device includes: a user terminal configured to configure and display a screen for a setting mode, on which a parameter value that determines drivability and traveling characteristic of the vehicle is displayed and from which a driver performs a change and a setting to the displayed parameter value; a controller configured to be provided in the vehicle, to receive a parameter value that results from the driver performing the change and the setting, from the user terminal, and to apply the received parameter value to control logic for controlling a traveling state of the vehicle; and a communication unit configured to be provided in the vehicle and to make a connection between the user terminal and the control unit in such a manner that transmission and reception of the parameter value are possible.

20 Claims, 10 Drawing Sheets

[FIG. 1]
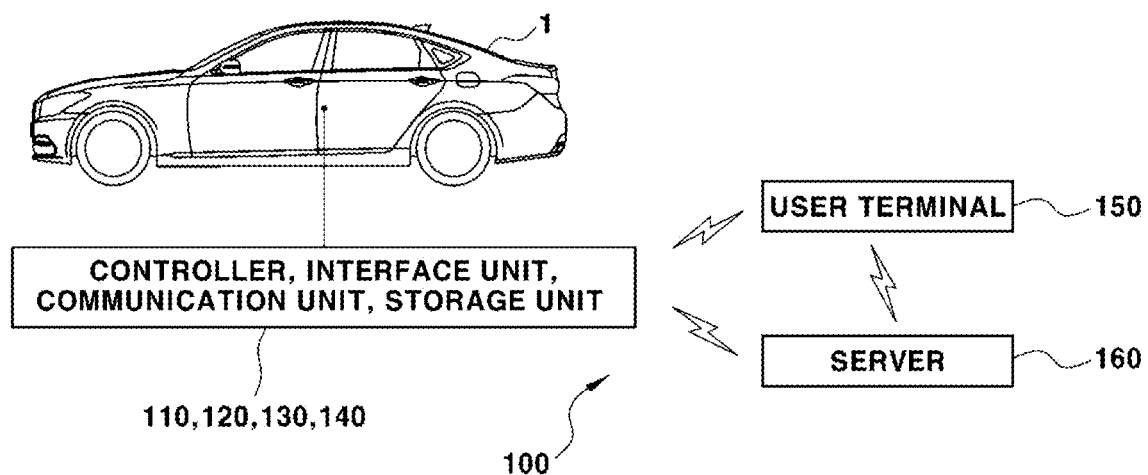
[FIG. 2]
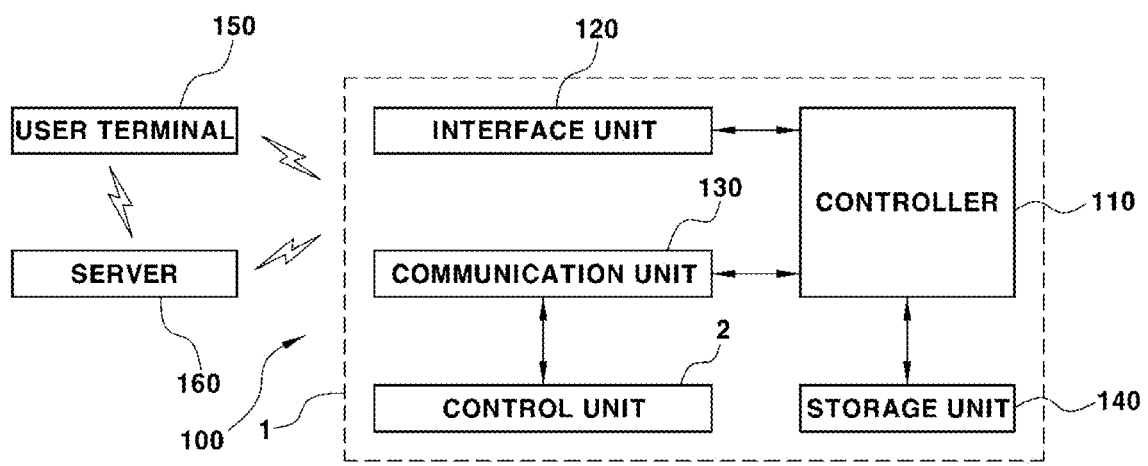

[FIG. 3]
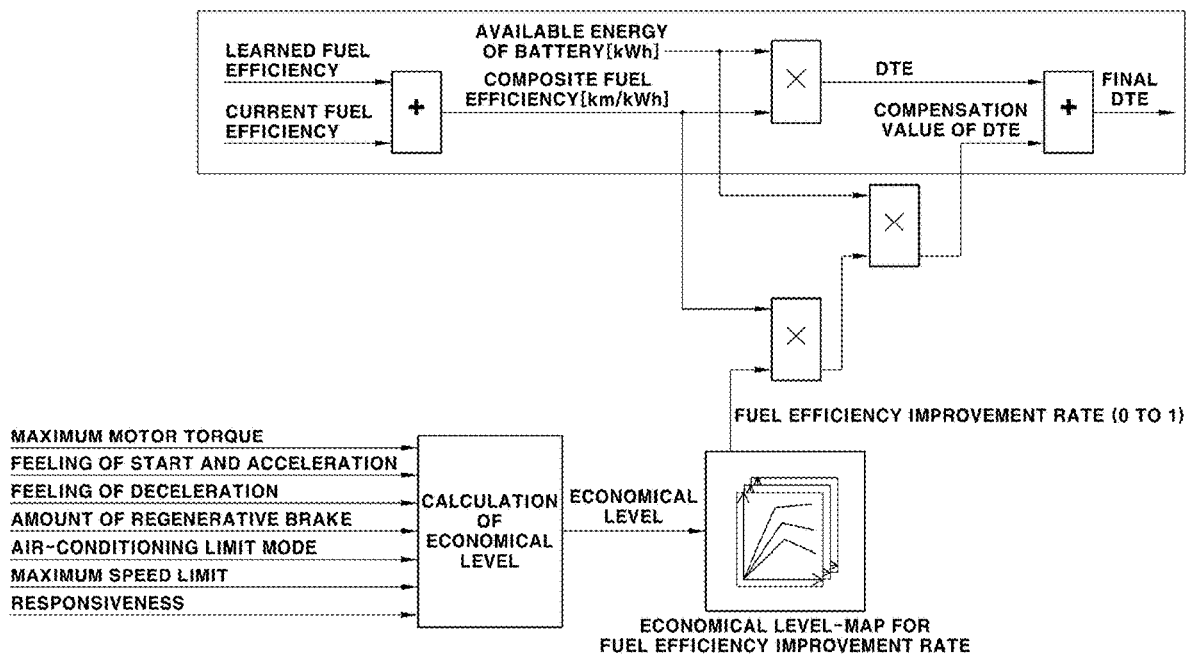

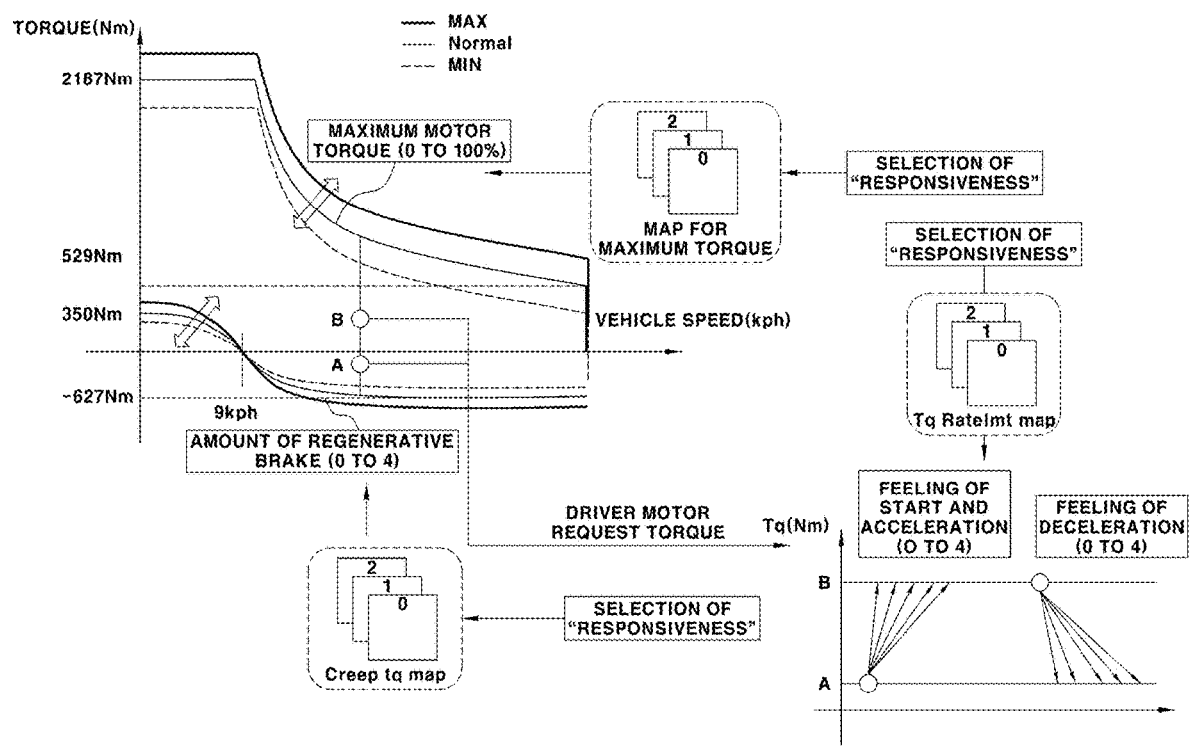
[FIG. 4]

[FIG. 5]
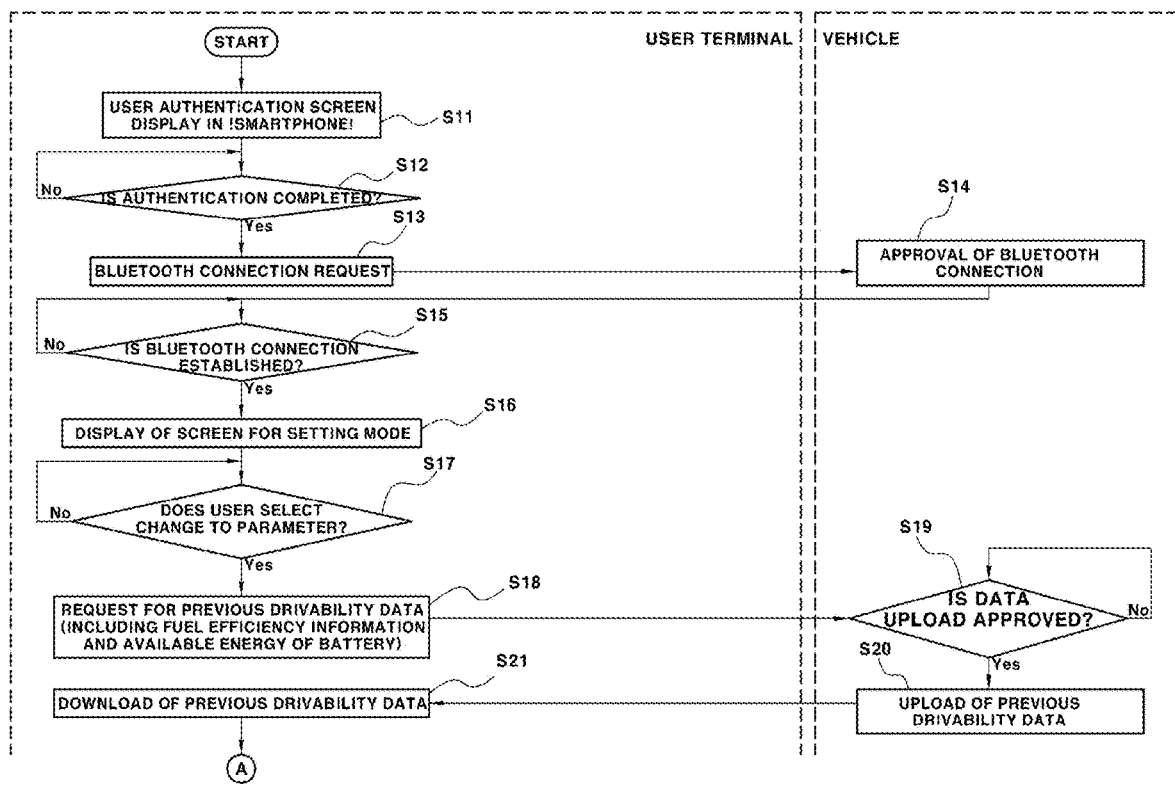

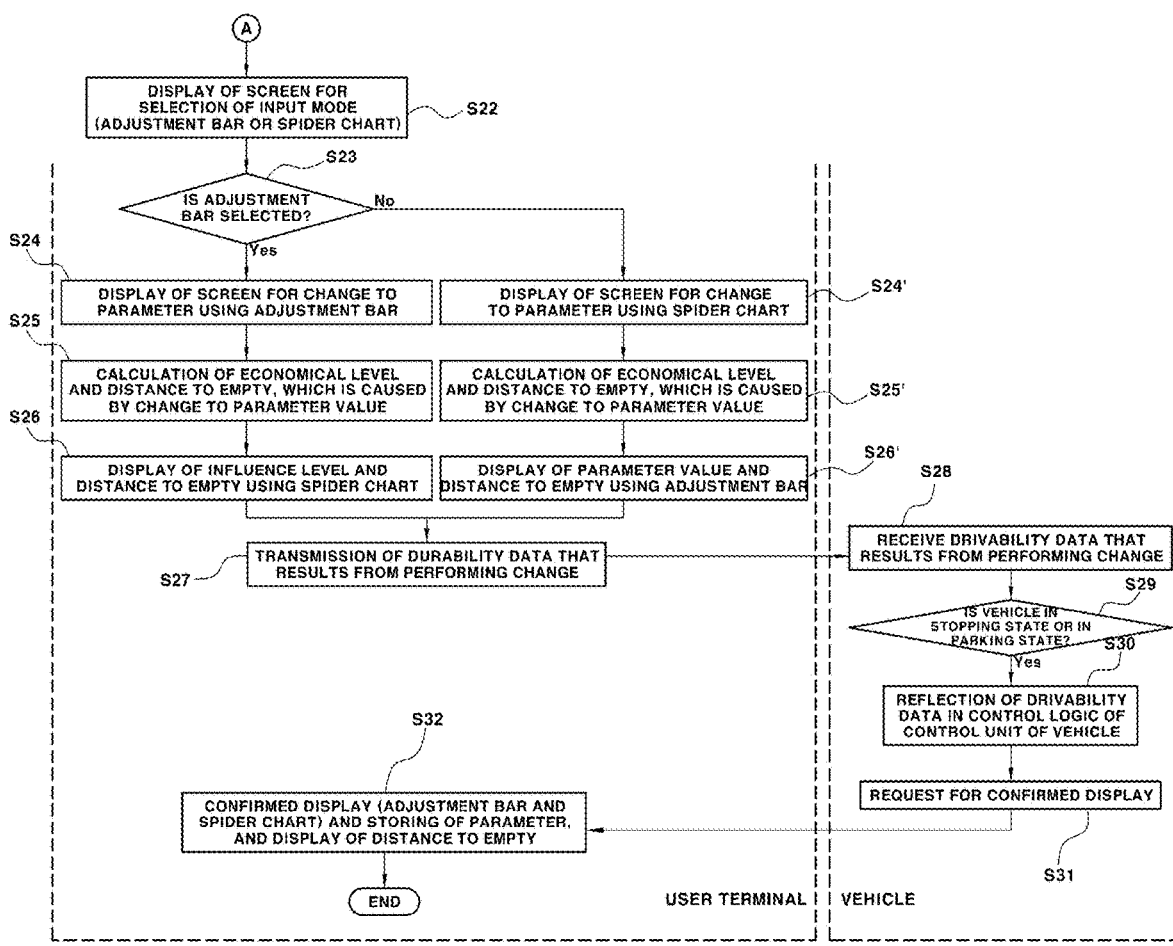

[FIG. 7]
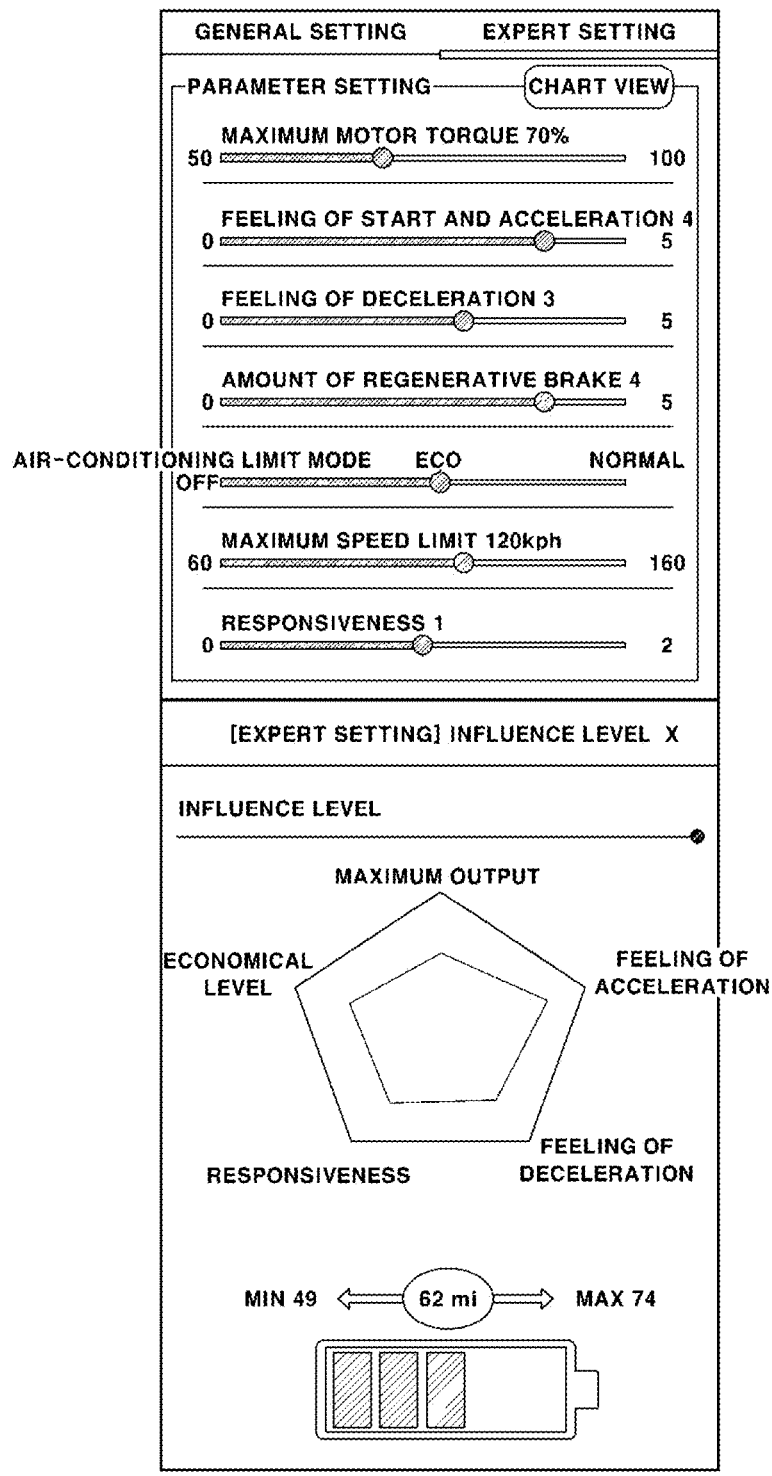

[FIG. 8]
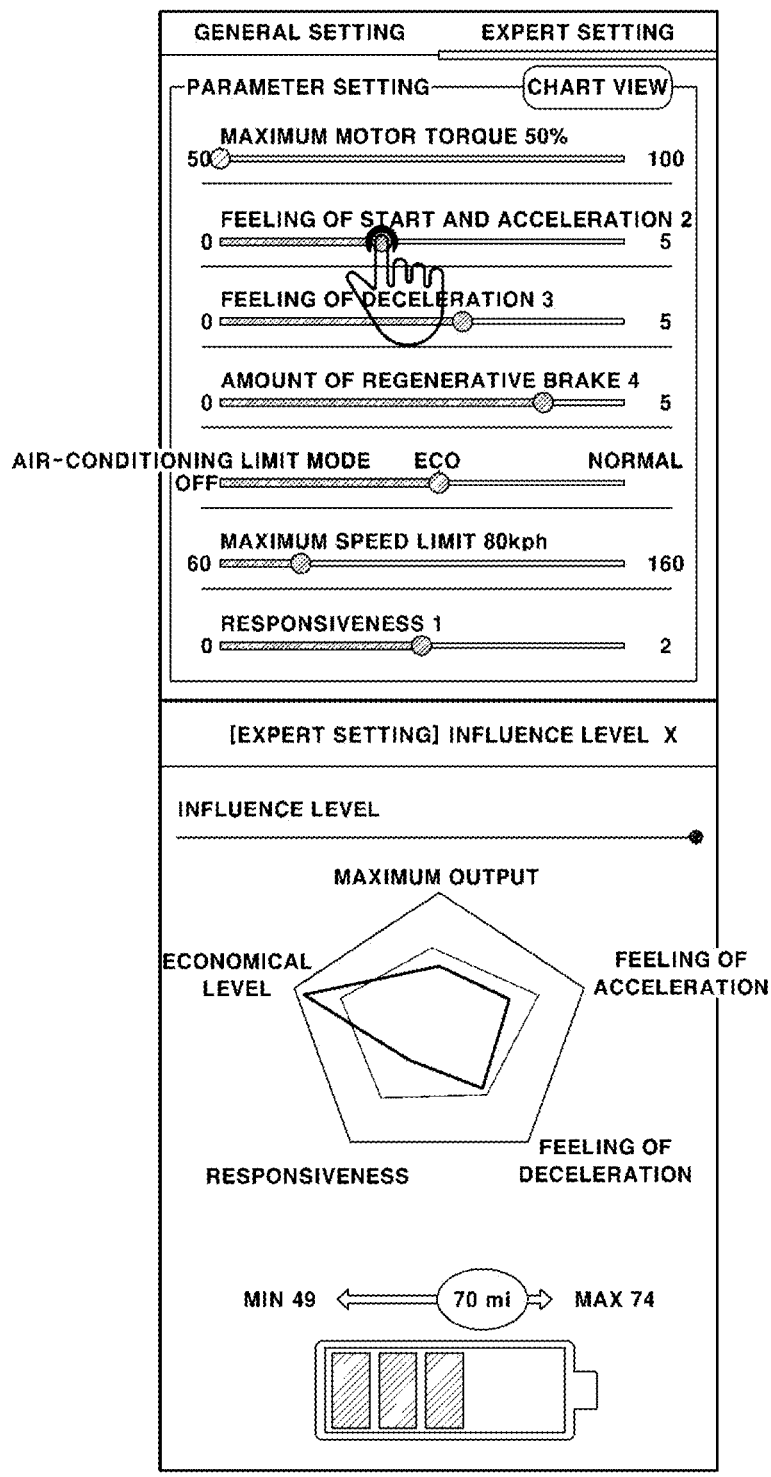

[FIG. 9]
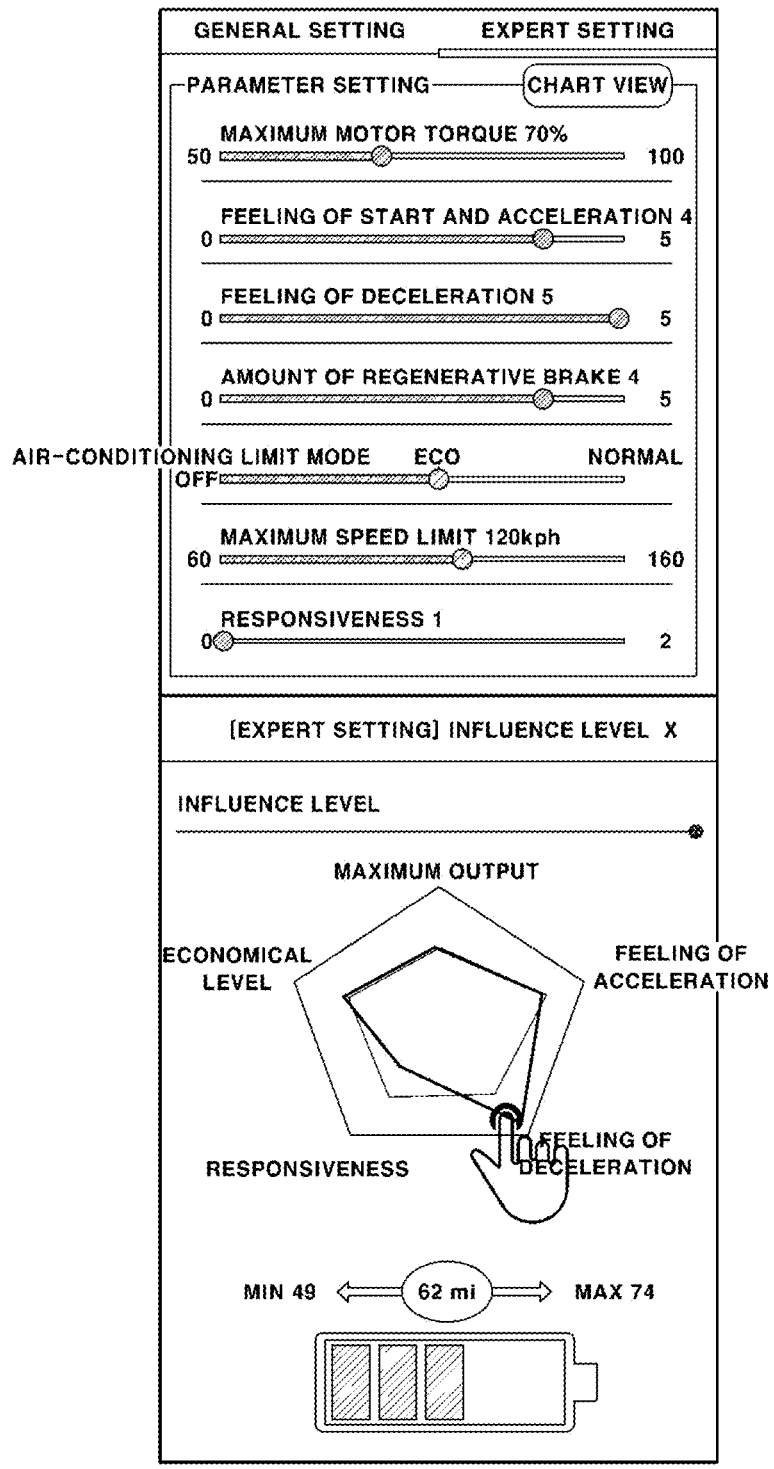

[FIG. 10]
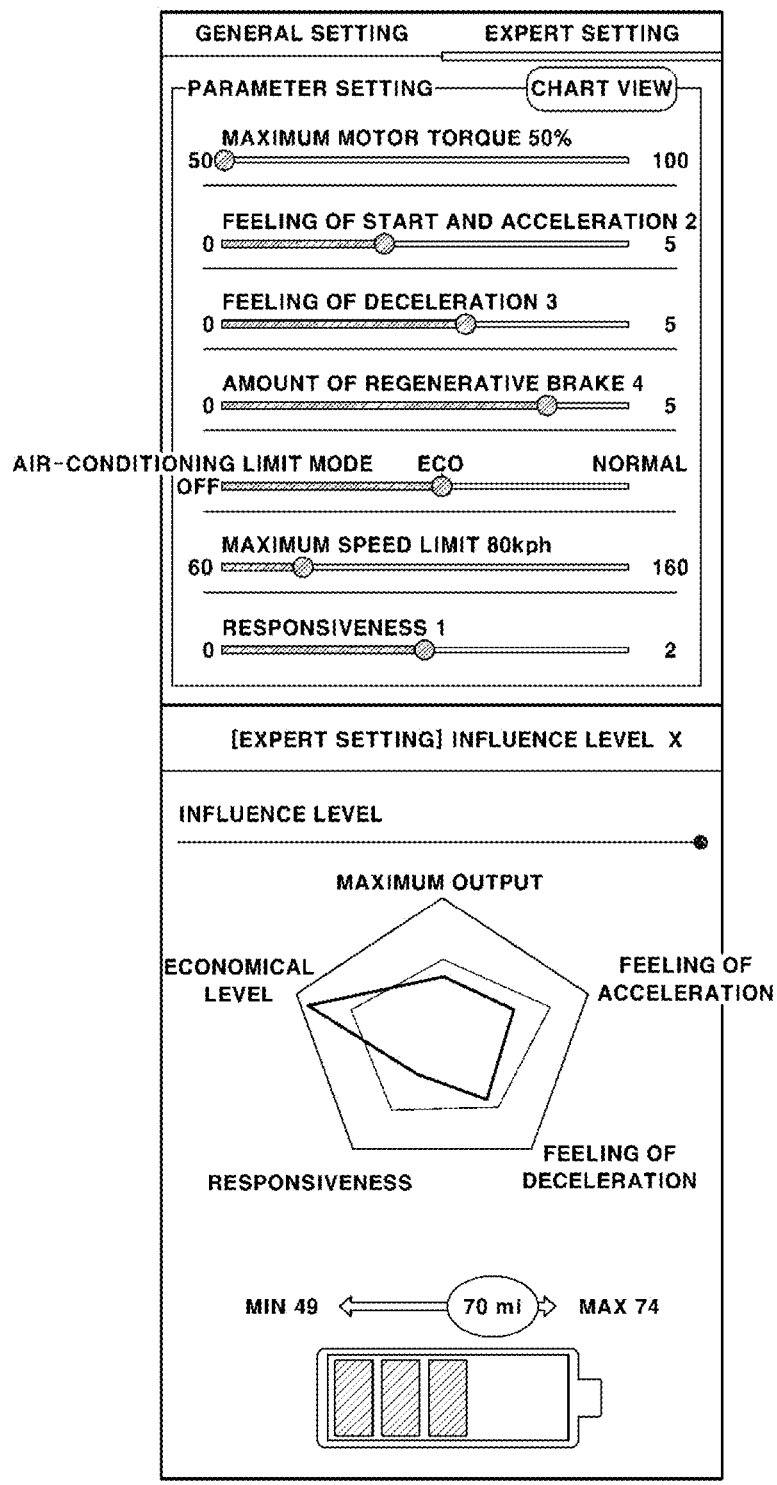

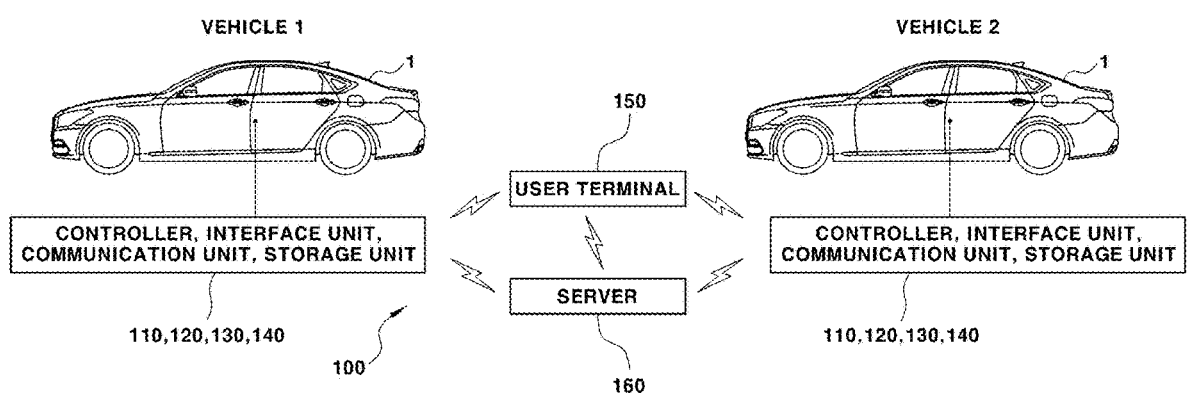
[FIG. 11]

DEVICE FOR AND METHOD OF CONTROLLING TRAVELING CHARACTERISTIC OF VEHICLE

CROSS REFERENCE TO RELATED APPLICATION

The present application claims priority to Korean Patent Application No. 10-2019-0000526, filed Jan. 3, 2019, the entire contents of which is incorporated herein for all purposes by reference.

BACKGROUND

Field

The present disclosure relates to a device for controlling a travelling characteristic of a vehicle and a method of controlling the travelling characteristic of the vehicle.

Description of the Related Art

In recent years, technologies in which a driver selects a traveling mode of a vehicle have been in use.

For example, in environment-friendly vehicles that travel using a motor as a vehicle drive source, such as hybrid electric vehicle (HEV), a plug-in hybrid electric vehicle (PHEV), and an electric vehicle (EV), traveling modes such as an economical mode, a normal mode, and a sports mode can be selected, and by operating a simple button, a driver can make a selection among the traveling modes and can switch among the traveling modes.

The disclosure of this section is to provide background of the invention. Applicant notes that this section may contain information available before this application. However, by providing this section, Applicant does not admit that any information contained in this section constitutes prior art.

SUMMARY

An aspect of the present invention provides a device for controlling a traveling characteristic of a vehicle that enables a driver to perform a change and a setting to a parameter value relating to drivability and traveling characteristic according his/her preference and to be provided with his/her desired drivability, thereby causing the vehicle to travel according to his/her desired traveling characteristic and increasing traveling satisfaction, and a method of controlling the traveling characteristic of the vehicle.

Another aspect of the invention provides a device for controlling a travelling characteristic of a vehicle in which a driver changes or sets a parameter value relating to drivability and traveling characteristic of the vehicle according to his/her preference and is provided with the drivability and the traveling characteristic of the vehicle according to the parameter value that results from performing the change, and a method of controlling the traveling characteristic of the vehicle.

Still another aspect of the present invention provides a driver-initiated drivability setting and displaying device that is capable of easily performing a change and a setting to drivability and a traveling characteristic in a vehicle that a driver drives for himself/herself.

According to an aspect of the present invention, a device for controlling a traveling characteristic of a vehicle includes: a user terminal configured to configure and display a screen for a setting mode, on which a parameter value that determines drivability and traveling characteristic of the vehicle is displayed and from which a driver performs a change and a setting to the displayed parameter value; a controller configured to be provided in the vehicle, to receive a parameter value that results from the driver performing the change and the setting, from the user terminal, and to apply the received parameter value to control logic for controlling a traveling state of the vehicle; and a communication unit configured to make a connection between the user terminal and the control unit in such a manner that transmission and reception of the parameter value is possible, in which the traveling state of the vehicle is controlled according to the parameter value that results from the user performing the change and the setting in the user terminal and is applied to the control logic, and thus the drivability and the traveling characteristic of the vehicle according to the controlled traveling state is provided to the driver.

In addition, according to another aspect of the present invention, a method of controlling a traveling characteristic of a vehicle, includes: enabling a user terminal to make a connection to controller of the vehicle through a communication unit; enabling the user terminal to configure and display a screen for a setting mode, from which a driver performs a change and a setting to a parameter value that determines drivability and traveling characteristic of the vehicle; enabling the user terminal to receive information that is the parameter value that results from performing the setting, from a controller of the vehicle and to display the received parameter value on the screen for the setting mode; enabling the user terminal to transmit a parameter value that results from performing the change and the setting, to the controller of the vehicle, when the change and the setting to the parameter value is performed from the screen for the setting mode; enabling the controller of the vehicle to apply the parameter value that results from performing the change and the setting, which is received from the user terminal, to control logic for controlling a traveling state of the vehicle; and controlling a traveling state of the vehicle according to the parameter value that is applied to the control logic and thus providing the drivability and the traveling characteristic of the vehicle according to the controlled traveling state to the driver.

With the device for and the method of controlling a traveling characteristic of a vehicle according to aspects of the present invention, it is possible that a driver performs a change and a setting from a parameter value relating to drivability and a traveling characteristic to his/her desired value on the vehicle. Thus, the driver who drives the vehicle is provided with his/her desired drivability (driving sensation) and the vehicle travels according to his/her desired traveling characteristic. This provides an effect of increasing traveling satisfaction.

Particularly, according to aspects of the present invention, it is possible that the driver initially performs the change and the setting to individual drivability (driving sensation) and traveling characteristic in the vehicle. This provides an effect that, although a different vehicle is used, the driver is provided with the drivability and the traveling characteristic according to his/her preference and driving personality in the same manner in the different vehicle.

In addition, according to aspects of the present invention, the driver easily performs the change and the setting to the drivability and the traveling characteristic in the vehicle that he/she drives, using a smartphone.

BRIEF DESCRIPTION OF THE DRAWINGS

The above and other aspects, features and other advantages of the present invention will be more clearly understood from the following detailed description when taken in conjunction with the accompanying drawings, in which:

FIG. 1 is a diagram illustrating a vehicle to which a device for controlling a traveling characteristic according to an embodiment of the present invention is applied;

FIG. 2 is a block diagram illustrating a configuration of the device for controlling the traveling characteristic according to the embodiment of the present invention;

FIG. 3 is a diagram illustrating a method of calculating a distance to empty (DTE) in the device for controlling the traveling characteristic according to the embodiment of the present invention from a user terminal;

FIG. 4 is a diagram illustrating an example in which a control value is determined in control logic according to a parameter value that results from a driver performing a change and a setting in the device for controlling the traveling characteristic according to the embodiment of the present invention;

FIGS. 5 and 6 are flowcharts, each illustrating a process of controlling the traveling characteristic of the vehicle according to the embodiment of the present invention;

FIG. 7 is a diagram illustrating previous drivability data and a display state of a distance to empty in a process of controlling the traveling characteristic of the vehicle according to the embodiment of the present invention;

FIGS. 8 and 9 are diagrams, each illustrating a state where a driver makes the change to a parameter and the display state of the distance to empty, in the process of controlling the traveling characteristic of the vehicle according to the embodiment of the present invention;

FIG. 10 is a diagram illustrating a fixed display state of the parameter value that is transferred to the vehicle in the process of controlling the traveling characteristic of the vehicle according to the embodiment of the present invention and is applied to the vehicle; and FIG. 11 is a diagram for describing a situation where, according to an embodiment of the present invention, it is possible that the driver sets his/her drivability data for a different vehicle.

DETAILED DESCRIPTION OF EMBODIMENTS

Specific features and advantages of the present invention will be more clearly understood from the following detailed description when taken in conjunction with the accompanying drawings. In case functions related to embodiments of the present invention and specific description for the configuration unnecessarily obscure the gist of the present invention, it is noticed that the specific description will be omitted.

An embodiment of the present invention will be described in detail below with reference to the drawings in such a manner that those ordinarily skilled in the art to which the present invention pertains will be able to practice the invention without undue experimentation.

In some vehicles, in the traveling mode, a control value, a parameter value, or the like is fixed as a value that is set by a manufacturer and thus the driver has to select one from among the traveling modes that are pre-set. In those vehicles, a traveling state of the vehicle is controlled using a control value or a parameter value that is set in advance as a fixed value in the traveling mode that is selected by the driver. When the driver selects the traveling mode, the vehicle is controlled by the mode-based control value or the parameter value that is pre-set by the manufacturer. Therefore, a traveling characteristic of the vehicle in the traveling mode, for example, drivability (driving sensation) such as a feeling of acceleration or a feeling of deceleration does not satisfy all drivers.

FIG. 1 is a diagram illustrating a vehicle to which a device for controlling a traveling characteristic according to an embodiment of the present invention can be applied. FIG. 2 is a block diagram illustrating a configuration of the device for controlling the traveling characteristic according to the embodiment of the present invention.

The device for controlling the traveling characteristic according to the embodiment of the present invention is provided in such a manner that a driver possibly performs a change and a setting from a parameter value to a desired value, for himself/herself, according to his/her personality and preference. Depending on the parameter value, the drivability of and a traveling characteristic of a vehicle 1 are determined by vehicle control logic.

The drivability here refers to driving sensation indicating how the driver feels about the traveling characteristic when driving the vehicle 1.

More specifically, according to embodiments of the present invention, the drivability and the traveling characteristic of the vehicle that are caused by the control logic to vary, depending on a parameter value that results from the driver performing the setting. The drivability and the traveling characteristic mean the driving sensation and a vehicle characteristic, respectively, that the driver feels in vehicle that is in a controlled traveling state, in a case where a traveling state of the vehicle is controlled, when operating the driving.

Furthermore, according to embodiments of the present invention, the parameter value is a value of a control parameter relating to the drivability (the driving sensation) that results when controlling the vehicle. In a case where the driver performs the change and the setting on the basis of each of the parameter items that are determined, the parameter value means a setting value of every parameter item that is caused by the control logic to exert an influence to the traveling characteristic of the vehicle or to make the change to the traveling characteristic.

Thus, according to embodiments of the present invention, if for setting, the driver makes the change to a parameter value, the traveling characteristic of the vehicle is adjusted according to a parameter value the results from performing the change, and the driver feels the driving sensation in accordance with the adjusted traveling characteristic.

In the following description, data that contain parameter values that are already set to be in the vehicle for multiple predetermined parameter items relating to the drivability and the traveling characteristic of the vehicle, or parameter values that result from newly making the change for setting are referred to as drivability data.

Furthermore, a device 100 for controlling a traveling characteristic according to the embodiment of the present invention is provided in such a manner that a setting mode for a parameter value relating to the drivability and the traveling characteristic of the vehicle is selected and is used.

In addition, according to embodiments of the present invention, as described above, it is possible that the driver performs the change and the setting to parameter values in the setting mode, but default values of parameter values may be stored in a storage unit 140 of the vehicle, which will be described below.

Accordingly, in a case where the driver performs an operation of initializing the drivability data (parameter values of an item relating to the drivability) through an interface unit 120 and a terminal 150, the parameter values are changed from values to that result from the driver performing the change and the setting previously in the vehicle, to the default values that are the initial setting values. Thereafter, the default values are applied, as the parameter values, to the control logic for vehicle traveling control.

The default value here is a given parameter value that corresponds to the drivability and the traveling characteristic in a normal mode that is applied to the vehicle and is a given parameter value that corresponds to an economical mode instead of the existing normal mode.

In addition, the device 100 for controlling the traveling characteristic according to the embodiment of the present invention is provided in such a manner that, when the driver selects the setting mode, separately from the user terminal 150 that will be described below, a screen for the setting mode for changing and setting a parameter value in the vehicle is configured and in such a manner that the setting mode is thus displayed on a display screen of the interface unit 120.

Accordingly, it is possible that, separately from the user terminal 150 that will be described above, the change and the setting to parameter values are performed through the screen for the setting mode, which is displayed on a display screen in the vehicle.

A specific configuration of the device for controlling the traveling characteristic according to the embodiment of the present invention will be described in detail below with reference to FIG. 2. With reference to FIG. 2, the device 100 for controlling the travelling characteristic of the vehicle according to the embodiment of the present invention includes a controller 110, the interface unit 120, a communication unit 130, the storage unit 140, and the user terminal 150. In addition to these, the device 100 for controlling the travelling characteristic control of the vehicle may further include an external server 160 that is located outside of the vehicle.

In the configuration of the device 100 for controlling the traveling characteristic, which is described above, the controller 110, the interface unit 120, the communication unit 130, and the storage unit 140, as illustrated in FIG. 1, are provided inside of the vehicle 1, except for the terminal 150 and the external server 160.

In addition, in the configuration of the device 100 for controlling the traveling characteristic according to the embodiment of the present invention, the constituent elements within the vehicle 1 may be formed in a manner that is integrally combined with any other control units within the vehicle. The constituent elements within the vehicle 1, as illustrated in FIG. 2, may be realized as separate devices, and may be connected to any other control unit 2 within the vehicle through a separate connection unit.

The configuration is described as follows. The controller 110 processes a signal that is transferred among the constituent elements of the device 100 for controlling the traveling characteristic. The control unit 2 within the vehicle processes a signal that is transferred from the user terminal 150 to the external server 160. The control unit 2 generates a signal that is to be transferred to the user terminal 150 and the external server 160.

In addition, according to embodiments of the present invention, in a case where the driver performs the change and the setting to a parameter value, the controller 110 performs control in such a manner that the driver applies a parameter value, which results from the driver performing the change and the setting, to the control logic for the vehicle traveling control.

At this time, the controller 110 performs control for cooperation with the control unit 2 for application of the parameter that results from the driver performing the change and the setting and for the vehicle traveling control associated with the application of the parameter.

For example, the controller 110 performs control in such a manner that the parameter value that results from the driver performing the change and the setting is transferred to the control unit 2 for the application to the control logic of the control 2.

One control unit 2 within the vehicle is illustrated in FIG. 2, but this is only for illustration. Multiple control units 2 that perform the vehicle traveling control through the control for the cooperation with the controller 110 may be provided within the vehicle.

For example, the controller 110 performs the control for the cooperation with the control units, such as a hybrid control unit (HCU), a vehicle control unit (VCU), an engine control unit (ECU) that control operation of an engine, a motor control unit (MCU) that controls operation of a motor, and a transmission control unit (TCU) that controls operation of a transmission.

In addition, the controller 110 controls operation of the entire device 100 for controlling the traveling characteristic. The controller 110 generates and outputs control signals for controlling operation of the other constituent elements of the device 100 for controlling the traveling characteristic. Accordingly, the operation of each of the constituent elements is controlled by the controller 110.

According to embodiments of the present invention, the driver performs the change and the setting for a parameter value from the user terminal 150, but it is possible that, without using the user terminal 150, the change and the setting are performed by inputting a parameter value directly into the controller 110 of the vehicle through an input unit of the interface unit 120, referring to the display screen of the interface unit 120 (the screen for the setting mode).

At this time, the controller 110 performs control in such a manner that parameter values that result from the driver performing the change and the setting using the user terminal 150 or the interface unit 120 are applied to the control logic for the vehicle traveling control.

In addition, the controller 110 is provided in such a manner that a parameter value that results from the driver previously performing the change and the setting through the user terminal 150 and the interface unit 120, that is, a setting value of every parameter is collected, and data (that is, the drivability data) that results from the collection is transmitted, on request, to the user terminal 150 or the external server 160.

At this point, the user terminal 150 to which the controller 110, as described above, transmits the data on request may be a terminal on which the setting is previously performed for a parameter value, or may be a terminal of another driver.

In addition, the controller 110 is provided in such a manner that data that contain a parameter value that is determined as a default value, that is, a default value that is determined for every parameter, as well as a parameter value that results from previously performing the change and the setting is transmitted, on request, to the user terminal 150 and the external server 160.

The interface unit 120 includes an input unit for inputting a control instruction from the driver, and an output unit that outputs an operation state of the device 100 for controlling the traveling characteristic, a result of processing, and the like.

The input units here include a key button, a mouse, a joystick, a jog shuttle, a stylus pen, and the like. Additionally, the input units may include a touch screen that is realized on a display. Any input unit through which an operation or an input by the driver is performed may be employed.

The output units include a display. The display may be a display that is provided as a part of a cluster computer or may be a display that is separately provided within the vehicle.

The input unit and the output unit may be integrated into one piece, as is the case with a touch screen. The output units may include an audio output unit such as a speaker.

The input unit is provided in such a manner that, separately from the user terminal 150, the driver can also perform the change and the setting to a parameter value (the drivability data) on the controller 110 in the vehicle.

To do this, the controller 110 controls driving of a display of the interface unit 120 in such a manner that the screen for the setting mode is displayed on the display in the vehicle 1 separately from the user terminal 150. The driver performs the change and the setting to the parameter value by operating the input unit of the interface unit 120 while viewing the screen for the setting mode that is displayed on the display of the interface unit 120 within the vehicle 1.

In addition, the display of the interface unit 120 is provided in such a manner that an operation state of, or a result of processing by, the device 100 for controlling the traveling characteristic, such as a state of pairing with the user terminal (a smartphone), various pieces of information for the changing and the setting to a parameter value, information on a result of the changing and the setting to the parameter value, and various pieces of information relating to traveling characteristic control are displayed.

The communication unit 130 includes a communication module that supports communication interface between the controller 110 and the control unit 2 that is provided in the vehicle 1, and between the controller 110 and each of the user terminal 150 and the external server 160.

For example, the communication module is provided in such a manner that information relating to the parameter value that results from the driver performing the change and the setting in the setting mode is received from the user terminal 150 for transfer to the controller 110, that the information relating to the parameter value is transferred from the controller 110 to the control unit 2, or that the information relating to the parameter value is transmitted and received between the controller 110 and the external server 160.

The communication modules here include a module that supports vehicle network communication, such as controller area network (CAN) communication for communication between the controller 110 and the control unit 2 within the vehicle, local interconnect network (LIN) communication, and Flex-Ray communication.

In addition, the communication modules include a module for wireless Internet connection and a module for short-distance communication, in order to perform communication between the user terminal 150 and the external server 160.

For example, the communication modules include a module for wireless LAN (WLAN), wireless broadband (Wibro), wireless fidelity (WiFi), world interoperability for microwave access (WiMax), global system for mobile communications (GSM), or Long Term Evolution (LTE), and a module for using the Internet, an intranet, a mobile communication network, a satellite communication network or the like.

In addition, the communication modules include a module for Bluetooth, ZigBee, Ultra Wide Band, or the like, which is a short-distance communication technology.

Data or algorithms for the device 100 for controlling the traveling characteristic according to embodiments of the present invention to operate, a result of processing by and a result of operation of, the device 100 for controlling the traveling characteristic, and the like are stored in the storage unit 140.

For example, setting values for the operation of the device 100 for controlling the traveling characteristic itself, default values that are initial setting values for parameter values that result from the driver performing the change in the setting mode, the parameter value that results from the driver performing the change and the setting, and the like are stored in the storage unit 140.

In addition, driver identification information, other setting values relating to the traveling characteristic control of the vehicle 1, which result from the driver performing the setting, and the like are stored in the storage unit 140.

In addition, pieces of information for displaying the screen for the setting mode on the interface unit 120 (the display) within the vehicle 1 separately from the user terminal 150, various instructions and algorithms for performing the change and the setting to the parameter value in the setting mode, and the like are stored in the storage unit 140.

At this time, an application that is the same as or similar to an application that is used in the user terminal 150 for used to change or input the parameter value is installed and used in the control unit 140.

The user terminal 150 is a terminal, as a personal terminal that is used for performing the changing and the setting to the parameter value, that is not only communicatively connected to the controller 110 through the communication unit 130 that is provided, as a constituent element of the device 100 for controlling the traveling characteristic, in the vehicle 1, but also possibly communicates with the external server 160 through a wireless network.

The user terminal 150 is a terminal in which the software in which the driver performs the change and the setting to the parameter value relating to the drivability and the traveling characteristic of the vehicle is installed, or is a smart device in which an application for performing the change and the setting to the parameter value, which is downloaded by the driver for himself/herself, is installed.

For example, the user terminal 150 is a smartphone that possibly makes a Bluetooth connection to a vehicle through the communication unit 130. The smartphone here is for information request, information transmission and reception, information input and display, and the like. According to embodiments of the present invention, specifically, the smartphone is used for performing the change and the setting to a parameter value.

In addition, as described above, the driver can perform an input operation for performing the setting and the change to the parameter value and so on using the smartphone (the user terminal) 150. Furthermore, the driver can view information that is input by the driver, information that results from the driver performing the setting, a result of processing in response to an input operation, an operation state of a device, and other pieces of information relating to the operation of the device, through the display screen of the smartphone 150.

In addition, using the smartphone 150, the driver can make a request to the controller 110 of the vehicle for pieces of information, such as a default value that is determined as an initial setting value of every parameter, and a parameter value that results from his/her or any other person performing the setting, and can download the pieces of information through the communication unit 130. Furthermore, the driver can upload the parameter value that is downloaded to his/her vehicle, to the device 100 for controlling the traveling characteristic of any other vehicle.

In addition, using the smartphone 150, the driver can make a connection to the external server 160 and then can upload the parameter value, which results from his/her performing the setting, to the server 160 and can store the parameter value in the server 160 for sharing with any other driver. Conversely, the driver can download information, such as the parameter value, that results from his/her or any other driver performing the change and the setting, which is loaded to the external server 160, from the external server 160 to the smartphone 150 and can store the information in the smartphone 150 for application to his/her vehicle. Thereafter, the driver can transmit the information to the controller 110 of the vehicle 1.

In this manner, according to embodiments of the present invention, information, such as a parameter value, that results from any driver performing the setting, e.g., the drivability data is shared with any other person, and it is possible that any other person downloads the drivability data, which results from a specific driver performing the setting, for application to his/her vehicle.

As an example, a case where the user terminal is a smartphone will be described below.

The external server 160 is connected to the vehicle through a wireless network. Furthermore, the external server 160 is connected to the controller 110 in the vehicle 1 through the communication unit 130 that is provided in such a manner that the driver possibly makes a connection using the smartphone 150.

The external server 160 makes a request to the controller 110 of the vehicle 1 for the information (the drivability data), such as the parameter value, that results from the driver performing the change and the setting and receives the information from the controller 110. Furthermore, the external server 160 receives the information, such as the parameter value, that results from the driver performing the change and the setting, from the smartphone 150 and stores the information. Conversely, the external server 160 transmits, on request, the information, such as the parameter value, that results from the driver performing the change and the setting, which is previously stored, to the controller 110 of the vehicle, or the smartphone 150 of the driver or any other driver.

Regarding the configuration of the device for controlling the traveling characteristic to the embodiment of the present invention is described above, the controller 110, the interface unit 120, the communication unit 130, and the storage unit 140, which are among the constituent elements of the device 100 for controlling the traveling characteristic, may constitute a multimedia system of a vehicle, e.g., audio, video & navigation (AVN) system.

In this case, the controller 110 may be a control unit of the AVN system. The controller 110 may be a separate control unit that is provided separately from the AVN system and is connected to the AVN system. For example, the controller 110 may be a high-level controller that controls vehicle's traveling, e.g., a hybrid controller that generates a command for torque of an engine and a motor that are vehicle drive sources, or a vehicle control unit (VCU).

In addition, the external server that is among the constituents of the device 100 for controlling the traveling characteristic may be a telematics multimedia system (TMS) server that provides a telematics service to the vehicle 1.

On the other hand, according to the embodiment of the present invention, with an application in the smartphone 150 (hereinafter referred to as "smartphone application", a distance to empty (DTE) for a vehicle is calculated based on information on vehicle's fuel efficiency, which is received from the controller 110 of the vehicle 1 through the communication unit 130, available energy of a battery, and information, such as the parameter value, that results from the driver performing the setting.

In addition, the smartphone application is provided in such a manner that the distance to empty that corresponds to the information (the drivability data) such as the parameter value, that results from the driver performing the setting is displayed on the screen of the smartphone 150 and is viewed by the driver.

Moreover, with the smartphone application, the same information as displayed on the screen of the smartphone 150 is displayed on the interface unit 120 of the vehicle 1, more precisely, the display of the interface unit 120 (smartphone mirroring).

The parameter values here are values that result from distinguishably digitizing magnitudes of parameters as values falling within a given range at a given format for one or more parameter items relating to the drivability and the traveling characteristic of the vehicle.

According to the embodiment of the present invention, the parameters relate to the drivability and the traveling characteristic of the vehicle, and are for at least one or more of maximum motor torque, a feeling of start and acceleration, a feeling of deceleration, an amount of regenerative braking, an air-conditioning limit mode, a maximum speed limit, and responsiveness.

In addition, according to the embodiment of the present invention, at least one or several of, or all of the parameter values that result from the driver performing the change and setting through the smartphone are used to calculate an economical level. Along with the information on fuel efficiency and the available energy of the battery, which are received from the vehicle, the economical level is used to calculate the distance to empty (DTE) for the vehicle.

FIG. 3 is a diagram illustrating a method of calculating the distance to empty (DTE) in the device for controlling the traveling characteristic according to the embodiment of the present invention from the smartphone (the user terminal).

By executing the application that is installed in the smartphone 150, the driver performs the setting to parameter values, e.g., parameter values of the maximum motor torque, the feeling of start and acceleration, the feeling of deceleration, the amount of regenerative braking, the air-conditioning limit mode, the maximum speed limit, and the responsiveness, as are illustrated. When this is done, with the smartphone application, as will be described below, the economical level is calculated using at least one or several of, or all of the parameter values. The distance to empty (DTE) for the vehicle is calculated from the economical level, information on vehicle fuel efficiency, and the available energy of the battery. The battery here is a battery that supplies electric power to a drive motor that drives a vehicle. In the following description, the motor means a drive motor that drives a vehicle.

The method of calculating the distance to empty is described in more detail below. The information on the vehicle fuel efficiency that is transmitted by the controller 110 of the vehicle 1 to the smartphone 150 through the communication unit 130 is on blended fuel efficiency (km/kWh) that is calculated using learning fuel efficiency that is learned by information that is collected in the vehicle while the vehicle travels, and current fuel efficiency (km/kWh) that depends on the current traveling state of the vehicle.

At this time, with the smartphone application, the distance to empty (DTE) (km) is calculated from the blended fuel efficiency and the available energy (kWh) of the battery.

In addition, the blended fuel efficiency that is obtained by blending the learning fuel efficiency and the current fuel efficiency results from reflecting the learning fuel efficiency for the driver, which is collected in the vehicle, in the current fuel efficiency that depends on the current traveling state of the vehicle.

As the method of calculating the blended fuel efficiency, a weighting-applied adding-up method of applying a weighting value to each of the learning fuel efficiency and the current fuel efficiency and adding up them is used. The sum of the two weighting values is 1 and is a fixed value that is predetermined or a variable value that is determined according to a condition of the vehicle.

Accordingly, the blended fuel efficiency is calculated in the controller 110 of the vehicle 1, and then the calculated blended fuel efficiency is transmitted to the smartphone 150. Thus, with the smartphone application, the distance to empty (DTE) is calculated that corresponds to the blended fuel efficiency and the available energy of the battery. At this time, the distance to empty is calculated as a value that results from multiplying the blended fuel efficiency (km/kWh) and the available energy of the battery together.

In addition, the economical level is calculated based on at least one or several of, or all of the parameter values of the maximum motor torque, the feeling of start and acceleration, the feeling of deceleration, the amount of regenerative braking, the air-conditioning limit mode, the maximum speed limit, and the responsiveness (a parameter value of the feeling of deceleration is not used to calculate the economical level). Thus, a fuel efficiency improvement ratio is determined.

At this time, a map for a fuel efficiency improvement rate is used in which a correlation between the economical level and the fuel efficiency improvement rate is defined. The fuel efficiency improvement rate is determined by a value that corresponds to an economical level value, using a map for the fuel efficiency improvement rate.

The map for the fuel efficiency improvement rate results from determining a value of the fuel efficiency improvement rate according to the economical level value, using data that are obtained in a prior test and evaluation process, and then mapping the value of the fuel efficiency improvement rate according to the economical level value.

The creation of the fuel efficiency improvement rate is described in more detail below. A specific value is determined as a default value, on the basis of each of the parameter items, such as the maximum motor torque, the feeling of start and acceleration, the feeling of deceleration, the amount of regenerative braking, the air-conditioning limit mode, the maximum speed limit, and the responsiveness. Then, the default value is reflected in vehicle control logic. Thereafter, fuel efficiency for the vehicle traveling on a real-world road is measured with a normal method of measuring fuel efficiency.

A default value of every parameter item is a parameter value that serves as a reference, which is predetermined on a per-item basis for fuel efficiency comparison. The default value is set to be the same value as or a value similar to a parameter value of every item in one of an economical mode, a normal mode, and a sports mode that are distinguished as a traveling mode.

For example, item-based parameter values that correspond to the usual normal mode are used as default values, among several of or all of the parameter items, such as the maximum motor torque, the feeling of start and acceleration, the feeling of deceleration, the amount of regenerative braking, the air-conditioning limit mode, the maximum speed limit, and the responsiveness.

A parameter value is changed within a parameter value range of parameter values that result from performing the setting on a per-parameter item basis, and the economical level value is calculated by combination of changed parameter values. Furthermore, the changed parameter value is reflected in the vehicle control logic. Thereafter, the fuel efficiency for the real-world road is measured, and then the measured fuel efficiency is compared with fuel efficiency that results when the default value is applied. Thus, the fuel efficiency improvement rate is determined.

At this time, although two combinations have the same economical level value, when a parameter value in each combination is reflected in the vehicle control logic and then the fuel efficiency for the real-world road is measured, the two combinations do not always have the same fuel efficiency and fuel efficiency improvement ratio. The two combinations, although having the same economical level, are different in terms of the fuel efficiency and the fuel efficiency improvement ratio.

However, in all combinations, there appears a similar tendency that as the economical level value is increased and decreased, the fuel efficiency and the fuel efficiency improvement ratio are increased and decreased. Therefore, if the obtained values of the fuel efficiency improvement ratios are tuned on the basis of the economical level value, a final fuel efficiency improvement ratio is obtained as a tuned representative value that corresponds to the economical level value.

Finally, the tuned representative value of the fuel efficiency improvement rate is mapped according to the economical level value, and thus it is possible that the map for the fuel efficiency improvement rate, as described above, is created.

The process of creating the map for the fuel efficiency improvement rate is described above to describe one method of creating a map that defines the correlation relationship between the economical level and the fuel efficiency improvement rate. This description is only for exemplification and does not impose any limitation on the present invention. Any method in which a map is created reflecting and considering the correlation relationship between the economical level and the fuel efficiency improvement rate may be employed as one of the various methods of creating the map for the fuel efficiency improvement rate.

Table 1A, Table 1B and Table 1C show a parameter value and an economical level in the usual normal mode, which result when a method of distinguishing among item-based parameter values is applied in the same manner according to embodiments of the present invention.

TABLE 1A

| | Minimal Value |
|---|---|
| | Maximum Motor Torque 100% |
| | Feeling of Start & Acceleration Phase 5 |
| | Amount of Regenerative Brake Phase 0 |
| | Mode of Air-conditioning Limit Mode (Normal) |
| | Maximum Speed Limit 160 km/hr |
| | Responsiveness Phase 2 |
| Fuel Efficiency | Reduction of 3% |
| Economical Level | 3.6 |

TABLE 1B

| | Normal |
|---|---|
| | Maximum Motor Torque 80% |
| | Feeling of Start & Acceleration Phase 3 |
| | Amount of Regenerative Brake Phase 1 |
| | Mode of Air-conditioning Limit Mode (Normal) |
| | Maximum Speed Limit 160 km/hr |
| | Responsiveness Phase 1 |
| Fuel Efficiency | Default |
| Economical Level | 5.02 |

TABLE 1C

| | Maximum Value |
|---|---|
| | Maximum Motor Torque 50% |
| | Feeling of Start & Acceleration Phase 0 |
| | Amount of Regenerative Brake Phase 4 |
| | Mode of Air-conditioning Limit Mode (Off) |
| | Maximum Speed Limit 60 km/hr |
| | Responsiveness Phase 0 |
| Fuel Efficiency | Increase of 5% |
| Economical Level | 11 |

Examples of a parameter item for which the driver performs the setting in the device 100 for controlling the traveling characteristic according to embodiments of the present invention includes the maximum motor torque, the feeling of start and acceleration, the feeling of deceleration, the amount of regenerative braking, the air-conditioning limit mode, the maximum speed limit, and the responsiveness. The driver performs the change and the setting to a parameter value of each item, and then the parameter values of the items are all reflected in the control logic. Thus, the traveling characteristic of the vehicle is controlled. However, according to embodiments of the present invention, one or several of, or all of the maximum torque, the feeling of start and acceleration, the feeling of deceleration, the amount of regenerative braking, the air-conditioning limit mode, the maximum speed limit, and the responsiveness are used to calculate the economical level.

In addition, Tables 1A-1C and Tables 2A-2C described below that will be described below show an example in which, among the parameter items for whose parameter values the driver is to perform the change and the setting, the feeling of deceleration is not used for calculating the economical level. However, the feeling of the deceleration may be reflected as well for calculating the economical level using a correlation relationship with the vehicle fuel efficiency.

According to embodiments of the present invention, an initial setting value for a parameter value relating to the drivability and the traveling characteristic of the vehicle, to which the driver possibly performs the change and the setting, e.g., a default value, is determined as a parameter value that corresponds to the normal mode in a usual vehicle.

When values in the normal mode are default values, a "minimal value" in Table 1A represents a combination of parameter values that correspond to minimum fuel efficiency and a minimum fuel efficiency rate. In some instances, the "minimal value" may represent a combination of minimum parameter values or maximum parameter values that correspond to the lowest fuel efficiency and the minimum fuel efficiency improvement rate within a range of parameter values that are determined on a per-parameter item basis. In this combination, the economical level is also at a minimum value of 3.6. The result of measurement of the fuel efficiency for the real-world road shows that a maximum decrease rate is 3% (the fuel efficiency rate is "−3%") compared with the fuel efficiency in the normal mode. In contrast, a "maximum value" in Table 1C represents a combination of minimum parameter values or maximum parameter values that correspond to the highest fuel efficiency and the maximum fuel efficiency improvement rate within the range of parameter values that are determined on a per-parameter item basis. In this combination, the economical level is also at a minimum value of 11. The result of measurement of the fuel efficiency for the real-world road shows that a maximum increase rate is 5% (the fuel efficiency rate is "+3%") compared with the fuel efficiency in the normal mode.

Numerical values in Tables 1A, 1B and 1C are for exemplification and this does not impose any limitation on the present invention. The numerical values are taken as examples and therefore are changeable.

As an example of the method of creating the map for the fuel efficiency improvement rate, in addition to the economical level and the fuel efficiency improvement rate that have the minimum value, the economical level and the fuel efficiency improvement rate that have the maximum value, and the economical level and the fuel efficiency improvement rate in the normal mode that is a fuel efficiency default mode, economical levels and fuel efficiency improvement rates for more combinations of changed item-based parameter values may be further calculated. When this is done, it is possible that a map in which fuel efficiency rates are set as values that correspond to the economical level is created.

The map for the fuel efficiency improvement rate is stored as smartphone application data for determining the fuel efficiency improvement rate for later use. When the fuel efficiency improvement rate (a value ranging from 0 to 1), as illustrated in FIG. 3, is determined from the economical level using the map for the fuel efficiency improvement rate, a compensation value of the distance to empty (DTE) is determined from the blended fuel efficiency, the available energy of the battery, and the fuel efficiency rate.

At this time, the compensation value of the distance to empty is calculated by multiplying the blended fuel efficiency, the available energy of the battery, and the fuel efficiency improvement rate together.

Accordingly, the distance to empty that is calculated from the available energy of the battery and the blended fuel efficiency is corrected using the compensation value of the distance to empty that is calculated as described above. The corrected distance to empty is a final distance to empty.

A method of adding the compensation value of the distance to empty to the distance to empty is used when making a correction. The final destination to empty (DTE) is obtained as a value that results from adding the compensation value of the distance to empty, which reflects the fuel efficiency improvement rate, to the distance to empty that is calculated from the available energy of the battery and the blended fuel efficiency.

A method of calculating the economical level from the parameter value that results from the driver performing the change and the setting will be described below.

First, according to the embodiment of the present invention, as described above, the parameters relating to the drivability and the traveling characteristic of the vehicle, to which the driver possibly performs the change and the setting, are for at least one or more items among the maximum motor torque, the feeling of start and acceleration, the feeling of deceleration, the amount of regenerative braking, the air-conditioning limit mode, the maximum speed limit, and the responsiveness.

In addition, according to embodiments of the present invention, when driving the vehicle, in order to feel his/her favorite drivability and traveling characteristic of the vehicle, the driver himself/herself can perform the change and the setting to a value of the parameter item, e.g., a parameter value of each of the items, from his/her smartphone application, according to his/her preference, and then can apply the resulting value to the vehicle control logic.

Then, according to embodiments of the present invention, when the driver performs the change and the setting to the parameter value of the item from the smartphone application, in the smartphone application, a corresponding item-based index value is obtained from parameter values of items (one or several items or all the items), based on which the economical level is determined, and then the economical level is obtained from the item-based index value.

In addition, after the economical level is obtained from the index value, the obtained economical level, as described above, is used to determine the fuel efficiency improvement rate from the map for the fuel efficiency improvement rate, and the determined fuel efficiency improvement rate is used to calculate the distance to empty.

At this point, the parameter item for which the driver is to perform the change and the setting, which relates to the drivability and the traveling characteristic of the vehicle will be described in more detail.

According to embodiments of the present invention, after index values are determined that correspond to parameter values (values that results from the driver performing the change and the setting) of at least one or several determined parameter items of all the parameter items, or that correspond to parameter of all the parameter items, the economical level is calculated using the determined index values of the parameter items.

At this time, the parameter items of which the index values are obtained to calculate the economical level are among the maximum motor torque, the feeling of start and acceleration, the feeling of deceleration, the amount of regenerative braking, the air-conditioning limit mode, the maximum speed limit, and the responsiveness, for all of which the driver possibly performs the change and the setting.

In examples in Tables 1A-1C and Tables 2A-2C that will be described below, only parameter values of six items other than the feeling of the deceleration, and corresponding index values are used to calculate the economical level.

When the driver performs the change and the setting to a parameter value of each item in this manner, all parameter values of all the items are not necessarily used to calculate the index value.

In embodiments, the index value may be obtained from parameter values of only one or several items, and the economical level may be calculated using the obtained index value of the one or several items. At this time, the final distance to empty (DTE) is calculated using the calculated economical level.

However, although the economical level and the distance to empty are calculated using only index values of one or several items, when, separately from this calculation, the driver performs the change and the setting to parameter values of the items described above, the parameter values that result from the driver performing the change and the setting are all applied to the control logic. At this time, in the control logic, a control value that corresponds to the parameter value of each item is determined from an item-based map (hereinafter referred to as "control map") within the control unit 2 and is used for control.

According to embodiments of the present invention, the parameter item that is applied to the control logic for the traveling characteristic of the vehicle is the same as the parameter item, for whose parameter value the driver performs the change and the setting, but may be the same as or different from the parameter item that is used to calculate the economical level, in terms of types of items and the number of items.

First, among the parameter items, the responsiveness is a parameter item of which a parameter value the driver possibly sets to one of three phases, e.g., one of Phase 0, Phase 1, and Phase 2. A physical parameter value is 0, 1, or 2 (refer to Tables 2A-2C and FIG. 7).

At this time, Phase 0 of the responsiveness may correspond to the economical (ECO) mode that is distinguished as a traveling mode for environment-friendly vehicles, Phase 1 of the responsiveness may correspond to the normal mode, and Phase 2 of the responsiveness may correspond to the sports mode.

The economical mode is a mode in which a control strategy that emphasizes the fuel efficiency and a control strategy that emphasizes a feeling of smooth starting are applied. The normal mode is a mode in which a control strategy is applied that provides faster starting and more dynamic driving than in the economical mode. The sports mode is a mode in which a control strategy that provides a starting torque slope and a dedicated transmission pattern is applied to emphasize a feeling of high-speed starting rather than the fuel efficiency.

In addition, the higher a parameter value (a physical value in Tables 2A-2C) of the responsiveness, the lower an index value (hereinafter referred to as "responsiveness index") of the responsiveness item for calculating the economical level.

For example, it is assumed that there are three parameter values of the responsiveness: 0, 1, and 2. It is determined that when the parameter value is 2 that corresponds to the sports mode, the vehicle fuel efficiency is lowest, and thus an index is determined as the lowest value. It is determined that when the parameter value is 1 that corresponds to the normal mode, an index is an intermediate value. It is determined that when the parameter value is 0, the vehicle fuel efficiency is highest, and thus an index is determined as the highest value.

As an example, it is predetermined that when the parameter value (the physical value) of the responsiveness is 0 (the economical mode), a responsiveness index is at the highest value of 1.1. It is predetermined that when the parameter value of the responsiveness is 1 (the normal mode), a responsiveness index is 1.

In addition, it is predetermined that when the parameter value of the responsiveness is 2 (the sports mode), a responsiveness index is at the lowest value of 0.9.

The value of the responsiveness index that, as described above, is determined on the basis of the parameter value of the responsiveness is stored as data for the smartphone application for later use.

On the other hand, the control value is determined in the control logic that controls the traveling characteristic of the vehicle, according to the parameter value of the item, which results from the driver performing the setting. After the driver sets the parameter of the responsiveness to 0, 1, or 2, in the case of the maximum motor torque, the feeling of start and acceleration, the feeling of deceleration, and the amount of regenerative braking, the parameter value of the item, which results from the driver performing the setting and the control value according to a vehicle driving state are determined using the control map that is selected according to the parameter value of the responsiveness.

A description of this is provided with reference to the drawings. FIG. 4 is a diagram illustrating an example in which the control value is determined in the control logic according to the parameter value that results from the driver performing the change and the setting in the device for controlling the traveling characteristic according to the embodiment of the present invention.

As illustrated, the control map for each of the maximum torque, the feeling of start and acceleration, the feeling of deceleration, and the amount of regenerative braking is selected according to the parameter value of the responsiveness, e.g., values of 0, 1, and 2, which result from the driver performing the setting. Thereafter, the parameter values of the maximum motor torque, the feeling of start and acceleration, the feeling of deceleration, and the amount of regenerative braking, for all of which the drive performs the setting, and the control value that corresponds to a current vehicle driving state are determined from the selected item-based control map.

According to embodiments of the present embodiment, among the parameters relating to the drivability and the traveling characteristic of the vehicle, the maximum motor torque takes a parameter value that is expressed as a percentage, and the driver performs the change and the setting to the parameter value of the maximum motor torque in a range of 50% to 100% (refer to Tables 2A-2C).

In addition, the parameter value (%) of the maximum motor torque defines a maximum limit value, e.g., the maximum motor torque value, of the motor torque that the motor is capable of producing according to the current vehicle driving state. The maximum torque value and the minimum torque value are set, as values according to the vehicle driving state, to be in a control map for the maximum motor torque (which is selected according to the parameter of the responsiveness). The maximum motor torque value that corresponds to the current vehicle driving state is determined from the maximum torque value and the minimum torque value.

At this time, regarding the control map for the maximum motor torque, in a control map in a case where the parameter value of the responsiveness is 0, a control map in a case where the parameter value of the responsiveness is 1, and a control map in a case where the parameter value of the responsiveness is 2, the maximum torque value and the minimum torque value, as shown in a graph in FIG. 4, are set according to the vehicle driving state. The maximum motor torque that is determined from the control map is determined as a value that results from "minimum torque value+(parameter value M/100×(maximum torque value−minimum torque value)".

At this point, the minimum torque value and the maximum torque value are values that correspond to the current vehicle driving state in the graph in FIG. 4. The current vehicle driving state, as shown in the graph in FIG. 4, includes a vehicle speed (kph).

At this time, the vehicle driving state further includes a sensor signal value that results when the driver presses an acceleration pedal, e.g., an accelerator position sensor (APS) value. According to embodiments of the present invention, the parameter value of the maximum motor torque that results from the driver performing the setting is transferred from the smartphone 150 to the control unit 110 through the communication unit 130, and then is applied to the control logic of the controller 110 in such a manner that the maximum motor torque is limited while the vehicle travels.

In addition, the parameter value of the maximum motor torque that results from the driver performing the setting is transferred from the controller 110 to the related control unit (the HCU or the VCU) 2 within the vehicle, and then is applied to the control logic of the control unit 2 in such a manner that the maximum motor torque is limited while the vehicle travels.

In a process in which in this manner, the parameter value (the drivability data) relating to the drivability and the traveling characteristic of the vehicle, which results from the driver perform the setting, is applied to the vehicle, there is no difference in parameters other than the maximum motor torque. The parameter values that results from the driver setting from the smartphone application are applied to the controller 110 in the vehicle or to the control logic within the control unit 2. Thus, the traveling characteristic of the vehicle is controlled according to the parameter value.

Accordingly, although the driver performs the same driving operation according to the parameter value relating to the drivability and the traveling characteristic of the vehicle, which results from performing the setting in advance, the drivability and the traveling characteristic of the vehicle that appear while the vehicle travels are differentiated. Thus, while driving the vehicle, the driver feels the drivability and the traveling characteristic as desired.

The maximum motor torque value (the maximum limit value of the motor torque) that is the control value of the maximum motor torque is described above as being determined by the control map (the map that is selected according to the parameter value of the responsiveness) when the parameter value (the physical value in FIG. 2) of the maximum motor torque, which results from the driver performs the change and the setting is applied to the control logic. Separately from this description, an index value of the maximum motor torque that is determined from the parameter value in order to calculate the economical level and the distance to empty will be described below.

Then, according to the embodiment of the present invention, the feeling of start and acceleration and feeling of deceleration are parameter items, a parameter value of each of which the operator possibly sets to one of six phases, e.g., one of Phase 0 to Phase 5. Therefore, the physical parameter value of each item is 0, 1, 2, 3, 4, or 5.

In addition, after the parameter values of the feeling of start and acceleration and the feeling of deceleration are determined, the control value is determined from a control map for the feeling of start and acceleration and a control map for the feeling of deceleration while the control logic is performed. At this time, a differentiated control map is used according to the parameter value of the responsiveness.

In embodiments, as is the case with the maximum motor torque, multiple control maps that are distinguished according to the parameter value of the responsiveness are provided as control maps for determining the control value of each of the feeling of start and acceleration and the feeling of deceleration. According to the parameter value of the responsiveness, the control map is selected from among the multiple control maps. The control value that corresponds to the parameter value of each of the feeling of start and acceleration and the feeling of deceleration is determined from the selected control map.

The control value of the feeling of start and acceleration here is a sensor signal value that results from the driver pressing the acceleration pedal, e.g., a value indicating a torque change slope and an amount of starting torque according to an APS value.

In embodiments, when the driver sets the parameter value of the feeling of start and acceleration to one of the six phases, the torque change slope and the amount of starting torque that correspond to the phase selected by the driver are selected in the control logic for application.

More specifically, when for setting, the driver changes the parameter value of the feeling of start and acceleration to one of the six phases, the controller 110 within the vehicle or the related control unit (for example, the HCU or the VCU) 2 determines driver request torque (motor torque that the driver requests) according to the APS value. In embodiments, the driver request torque that changes according to a slope that corresponds to the parameter value that results from performing the setting is determined. An amount of vehicle starting torque is also determined as an amount of torque that corresponds to the parameter value.

Accordingly, when the parameter values that result from the driver performing the setting in advance are different, although the APS values according to the pressing of the acceleration pedal by the driver while the vehicle travels are different, the amount of vehicle starting torque and the torque change slope (including a filter) are differentiated.

According to embodiments of the present invention, the greater the parameter value (0, 1, 2, 3, 4, or 5) of the feeling of start and acceleration, which results from the driver performing the setting, the lower the vehicle fuel efficiency. Therefore, an index value for calculating the economical level is determined as a lower value (refer to Table 3 that is an integrated table).

A value of the feeling of deceleration is a value that results from the driver pressing the acceleration pedal, e.g., a value indicating total brake torque according to a brake pedal sensor (BPS) value, or deceleration (D). Alternatively, the value of the feeling of deceleration may be a change slope of brake torque.

When the driver sets the parameter value of the feeling of deceleration to one of the six phrases as described above, the total brake torque according to the brake pedal sensor (BPS) value, the slope, or the deceleration is determined, in the control logic, as a value that corresponds to the phase selected by the driver.

More specifically, when for setting, the driver changes the parameter value of the feeling of deceleration to one of the six phrases, the controller 110 within the vehicle or the related control unit 2 determines the brake torque according to the BPS value, the slope, or the deceleration. In embodiments, the total brake torque, the slope thereof, or the deceleration is determined using a map that corresponds to the parameter value that results from performing the setting.

In embodiments, the total brake torque, the slope thereof, or the deceleration is determined differently according to the parameter value. For example, although the BPS values are the same, the total brake torque, the slope thereof, or the deceleration are differentiated using a different graph (or map), according to the parameter value.

At this point, the control unit 2 within the vehicle a brake control unit (BCU) or an integrated brake actuation unit (iBAU) as is the case with the usual vehicle.

In addition, the amount of regenerative braking is a parameter item of which parameter value the driver possibly sets to one of five phases, e.g., one of Phase 0 to Phase 4. At this time, the physical parameter value is 0, 1, 2, 3, or 4.

The amount of regenerative braking is for adjusting an amount of regeneration (an amount of charge by the motor) (an amount of coast regeneration) (which may be a torque value) by the motor under a vehicle coasting condition (acceleration pedal tip-out or brake-off while the vehicle travels) to according to the driver's preference. In embodiments, as is the case with the maximum motor torque, multiple control maps that are distinguished according to the parameter value of the responsiveness are provided as control maps for determining the control value of the amount of regenerative braking. According to the parameter value of the responsiveness, the control map is selected from among the multiple control maps. The control value that corresponds to the parameter value of the amount of regenerative braking is determined from the selected control map.

At this time, a control value (a value of the amount of regenerative braking) of the amount of regenerative braking is determined, in the selected control map, as a parameter value of the amount of regenerative braking that results from the driver performing the setting and as a value according to the current vehicle driving state.

In embodiments, the value of the amount of regenerative braking that is used in the control logic is determined from the parameter value of the amount of regenerative braking and the current vehicle driving state, using the control map that is selected according to the parameter value of the responsiveness.

At this point, the vehicle driving state for determining the value of the amount of regenerative braking includes the vehicle speed.

In FIG. 4, a control map (including a graph) for the amount of regenerative braking, which is selected according to the parameter value of the responsiveness, is illustrated as is the case where the maximum motor torque, the feeling of start and acceleration, and the feeling of deceleration. The value of the amount of regenerative braking (which may be the torque value) that is the control value for the control logic is determined from the parameter value of the amount of regenerative braking and the vehicle speed that is the current vehicle driving state, using the illustrated control map.

At this time, in the control map, under the same condition, the greater the parameter value (0 to 4) of the amount of regenerative braking, the greater the value of the amount of regenerative braking that is the control value, which results from performing the setting.

The greater the parameter value of the amount of regenerative braking, the higher the regenerative braking torque that is determined from the control map when a comparison is made under the condition that the vehicle driving states (the vehicle speeds) are the same. Therefore, the higher the parameter value of the amount of regenerative braking, the larger the amount of energy recovery and the greater the contribution to an increase in the fuel efficiency.

In addition, the higher the parameter value of the amount of regenerative braking, the higher the feeling of deceleration that the driver feels while the vehicle coasting is in progress. At the same time, the amount of energy recovery (the amount of battery charging by the motor) increases. This is more effective in increasing the fuel efficiency.

In addition, the air-conditioning limit mode is a parameter item of which a parameter value is possibly set to one of OFF mode, ECO mode, and NORMAL mode. The maximum speed limit is possibly set to fall within a range of 60 to 160 km/hr.

The air-conditioning limit mode is a mode for differentiating air-conditioning energy (cooling or heating energy) according to the parameter value that results from the driver performing the setting, e.g., a mode (OFF mode, ECO mode, or NORMAL mode) that is selected by the driver even under the same air-conditioning load and air-conditioning condition. For example, it is possible that a mode setting is performed in such a manner that air-conditioning energy in ECO mode is 70% of air-conditioning energy in NORMAL mode.

In embodiments, if the magnitude of air-conditioning energy (an amount of air-conditioning) that is calculated according to the air-conditioning load and air-conditioning condition in NORMAL mode is 100%, air-conditioning energy in ECO mode is determined as being approximately 70% of air-conditioning energy in NORMAL mode under the same air-conditioning load and air-conditioning condition.

In addition, OFF mode means that the air-conditioning energy is 0%. This is different from turning-off of vehicle air-conditioning.

For example, in a case where for cooling, an air conditioner is turned on, a compressor operates to compress refrigerant and a fan operates to supply or discharge air cooled by the compressor into a room. According to embodiments of the present invention, OFF mode in which the air-conditioning energy 0% is a mode for turning off only the compressor and operating the fan. At this time, because the fan continues to operate, the still-cooled air continues to be supplied.

Unlike in NORMAL mode, the limited air-conditioning energy is used in this manner in ECO mode. Thus, an amount of energy that is consumed within the vehicle is reduced. This is more effective in increasing the fuel efficiency.

In addition, in the case of the maximum speed limit, the parameter value that results from the driver performing the setting is just a control value. The maximum speed limit is for limiting a maximum speed of a vehicle. Although the driver steps up on the acceleration pedal, the vehicle speed is limited, not exceeding the maximum speed limit.

Therefore, the lower the maximum speed limit that results from performing the setting, the more economical the driving. This is more effective in increasing the fuel efficiency.

On the other hand, after the driver performs the change and the setting to a parameter value of each item from the smartphone application, the economical level that corresponds to the parameter value that results from making the change is determined in the smartphone application in order to calculate the distance to empty. The economical level is calculated using Equation 1.

Economical level=responsiveness index×{$D$+the sum of indexes of parameter items}  Equation 1

Calculation of the economical level is in more detail described. According to embodiments of the present invention, as expressed in Equation 1, the economical level is calculated using a value of D and index values that are calculated on a per-parameter item basis.

At this time, among multiple parameter items that are used for the calculation of the economical level, as in Equation 1, the value of D is added to a value that results from adding up indexes of parameter items other than the responsiveness. Then, the economical level is obtained by multiplying the result of the value of D being added to the value by the responsiveness index.

D in Equation 1 is a default value for setting a lower limit value (a minimum value) of the economical level and is a value that is determined as a constant. For example, D=4. In this case, if a configuration is employed in such a manner that the economical level is determined using six parameter items other than the feeling of deceleration as in Equation 1 and Tables 2A-2C, a maximum value of the economical level is 11 points.

Tables 2A-2C show an example in which a physical parameter value of each item, an index range for each item, and an index value according to the parameter value that results from performing the setting, as an example of a driver's setting, are determined.

TABLE 2A

|  | Item | | | | |
| --- | --- | --- | --- | --- | --- |
|  | Physical Value | Calculation Index of Economical Level Item | | Example 1 (Existing Normal) | |
|  |  | Slope | Range | Physical Value | Index |
| Maximum Motor Torque | 50 to 100% | −0.02 | 1 to 0 | 80% | 0.4 |
| Feeling of Start & Acceleration | Phase 0 to Phase 5 | Refer to Composite Table | 0 to 2 | Phase 3 | Combined with Amount of Regenerative Brake |
| Feeling of Deceleration | Phase 0 to Phase 5 | Not Reflected in Economical Level | | | |
| Amount of Regenerative Brake | Phase 0 to Phase 4 | Refer to Composite Table | 0 to 2 | Phase 1 | 0.62 (Composite Index) |
| Air-conditioning Limit Mode | Off/ECO/ NORMAL |  | Off: 2 ECO: 1 NORMAL: 0 | NORMAL | 0 |
| Maximum Speed Limit | 60~160 km/hr | −0.01 | 1 to 0 | 160 | 0 |

TABLE 2A-continued

| | Item | | | | |
|---|---|---|---|---|---|
| | Physical Value | Calculation Index of Economical Level Item | | Example 1 (Existing Normal) | |
| | | Slope | Range | Physical Value | Index |
| Responsiveness | Phase 0 to Phase 2 | | Phase 0: 1.1<br>Phase 1: 1<br>Phase 2: 0.9 | Phase 1 | 1 |
| Economical Level | responsiveness index x {D + sum of item indexes} | | | | 5.02 |

TABLE 2B

| | Item | | | | |
|---|---|---|---|---|---|
| | Physical Value | Calculation Index of Economical Level Item | | Example 2 (Existing Normal) | |
| | | Slope | Range | Physical Value | Index |
| Maximum Motor Torque | 50 to 100% | −0.02 | 1 to 0 | 60% | 0.8 |
| Feeling of Start & Acceleration | Phase 0 to Phase 5 | Refer to Composite Table | 0 to 2 | Phase 2 | Combined with Amount of Regenerative Brake |
| Feeling of Deceleration | Phase 0 to Phase 5 | | Not Reflected in Economical Level | | |
| Amount of Regenerative Brake | Phase 0 to Phase 4 | Refer to Composite Table | 0 to 2 | Phase 2 | 1.04 (Composite Index) |
| Air-conditioning Limit Mode | Off/ECO/NORMAL | | Off: 2<br>ECO: 1<br>NORMAL: 0 | ECO | 1 |
| Maximum Speed Limit | 60~160 km/hr | −0.01 | 1 to 0 | 120 | 0.4 |
| Responsiveness | Phase 0 to Phase 2 | | Phase 0: 1.1<br>Phase 1: 1<br>Phase 2: 0.9 | Phase 0 | 1.1 |
| Economical Level | responsiveness index x {D + sum of item indexes} | | | | 7.96 |

TABLE 2C

| | Item | | | | |
|---|---|---|---|---|---|
| | Physical Value | Calculation Index of Economical Level Item | | Example 3 (Existing Sports) | |
| | | Slope | Range | Physical Value | Index |
| Maximum Motor Torque | 50 to 100% | −0.02 | 1 to 0 | 100% | 0 |
| Feeling of Start & Acceleration | Phase 0 to Phase 5 | Refer to Composite Table | 0 to 2 | Phase 2 | Combined with Amount of Regenerative Brake |
| Feeling of Deceleration | Phase 0 to Phase 5 | | Not Reflected in Economical Level | | |
| Amount of Regenerative Brake | Phase 0 to Phase 4 | Refer to Composite Table | 0 to 2 | Phase 2 | 0.2 (Composite Index) |
| Air-conditioning Limit Mode | Off/ECO/NORMAL | | Off: 2<br>ECO: 1<br>NORMAL: 0 | NORMAL | 0 |
| Maximum Speed Limit | 60~160 km/hr | −0.01 | 1 to 0 | 160 | 0 |
| Responsiveness | Phase 0 to Phase 2 | | Phase 0: 1.1<br>Phase 1: 1<br>Phase 2: 0.9 | Phase 2 | 0.9 |
| Economical Level | responsiveness index x {D + sum of item indexes} | | | | 3.78 |

Among the item-based indexes as described above, a maximum motor torque index is a parameter value that results from the driver performing the setting for the maximum motor torque item, e.g., a value indicating the degree to which the maximum motor torque value (an arbitrary value among values of 50 to 100%) contributes to vehicle drive for fuel efficiency.

According to embodiments of the present invention, the higher value the maximum motor torque index takes, the more the vehicle fuel efficiency is improved. At this point, the maximum motor torque is determined as one of values of 0 to 1.

The higher the maximum motor torque value, the lower the fuel efficiency. Therefore, the higher the value of the maximum motor torque, the lower value the maximum motor torque index is set to in a range of 0 to 1.

As an example, the maximum motor torque value is set to be in a range of 50 to 100%. At this time, the maximum motor torque index takes one of values of 0 to 1. The maximum motor torque index takes a value that changes linearly according to the maximum motor torque value, a change slope of the maximum motor torque index is −1/50 (=−0.02).

Therefore, the maximum motor torque value takes a minimum value of 50% and a maximum value of 100%, the index value that changes linearly according to the maximum motor torque value is determined in a value range of 1 to 0, with the slope being set to −0.02 (that is, −1/(50%). When x is the maximum motor torque value (50% to 100%) and y is the maximum motor torque index (0 to 1), the maximum motor torque index is determined from the maximum motor torque value using Equation "$y=-0.02x+2$".

In addition, in the case of the feeling of start and acceleration and the amount of regenerative braking, one integrated index, e.g., a composite index is used for determining the economical level. The composite index is determined as one of values of 0 to 2 and is determined from an integrated table such as Table 3. The composite index is determined in a range of 0 to 2 from the parameter value (Phase 0 to Phase 5) of the feeling of start and acceleration and the parameter value (Phase 0 to Phase 4) of the amount of regenerative braking using Table 3 that is an integrated table.

TABLE 3

| Feeling of Start & Acceleration-Amount of Regenerative Brake | 0 | 1 | 2 | 3 | 4 |
|---|---|---|---|---|---|
| 5 | 0 | 0.1 | 0.2 | 0.3 | 0.4 |
| 4 | 0.24 | 0.36 | 0.48 | 0.6 | 0.72 |
| 3 | 0.48 | 0.62 | 0.76 | 0.9 | 1.04 |
| 2 | 0.72 | 0.88 | 1.04 | 1.2 | 1.36 |
| 1 | 0.96 | 1.14 | 1.32 | 1.5 | 1.68 |
| 0 | 1.2 | 1.4 | 1.6 | 1.8 | 2 |

With reference to FIG. 3, it is understood that, because the higher the value (a parameter value that is among Phase 0 to Phase 5) of the feeling of start and acceleration, the lower the vehicle fuel efficiency and thus, the lower value the index is set to. Furthermore, it is understood that conversely, the higher the value (a parameter value that is among Phase 0 to Phase 4) of the amount of regenerative braking, the higher the vehicle fuel efficiency, and thus the higher value the index is set.

Table 3 that is an integrated table is stored as data for the smartphone application and is used for determining a composite index of the feeling of start and acceleration and the amount of regenerative braking.

With reference to Tables 2A-2C, it is understood that, in the case of the feeling of start and acceleration and the amount of regenerative braking, the composite index is obtained from the parameter value (the physical value) that results from the driver performing the setting using Table 3 that is an integrated table. Furthermore, it is understood that the composite index that is obtained in "Example 1", "Example 2", and "Example 3" is described for an index of the amount of regenerative braking.

In addition, in an equation for calculating the economical level in Tables 2A-2C, "sum of item indexes" means a value that results from adding up the maximum motor torque index, the composite index of the feeling of start and acceleration and the amount of regenerative braking, an air-conditioning limit mode index, and a maximum speed limit index other than the responsiveness index.

In addition, in an example in Tables 2A-2C, among parameters for whose parameter values the driver is to perform the setting, the feeling of deceleration is not used for calculating the economical level, but the feeling of deceleration may also be reflected for calculating the economical level using the correlation relationship with the vehicle fuel efficiency.

In this case, the index value according to the value (the parameter value) of the feeling of deceleration is determined, and therefore, in Equation 1, the economical level is calculated by additionally adding an index of the feeling of deceleration.

In this manner, the index value for calculating the economical level is determined from the parameter value relating to the drivability and the traveling characteristic, which results from the driver performing the setting from the smartphone, using the information (the slope, the table, or the like) that is contained in the application data. The economical level is determined as a value that results from adding up the determined index values.

At this time, in the smartphone application, the economical level is calculated by adding up indexes that correspond to the parameter values of one or several of, or all of the parameter items, to which the driver possibly performs the setting.

Numerical values that are described in Tables 1A-1C and Tables 2A-2C are for exemplification, and therefore, in a case where the invention is reduced to practice, various changes to the numerical values are possible. The present invention is not limited to the numerical numbers in Tables 1A-1C and Tables 2A-2C.

Next, a process of controlling the traveling characteristic of the vehicle according to the embodiment of the present invention will be described with reference to FIGS. 5 and 6.

FIGS. 5 and 6 are a flowchart illustrating the process of controlling the traveling characteristic of the vehicle according to the embodiment of the present invention.

FIGS. 5 and 6 are the first part and the second, respectively of the flowcharts. The first part and the second part meet at A. A process that is performed by an application in the user terminal (the smartphone) 150 is illustrated on the left side, and a process that is performed by the controller 110 of the vehicle is illustrated on the right side.

First, the driver (a user) executes an application that is downloaded in advance and installed on the smartphone 150 and then performs an authentication process of identifying whether or not a current driver is a proper user who is registered in advance in the application by inputting a password input or using a biological authentication method, such as finger recognition, iris recognition, or face recognition (S11 and S12).

Of course, in a state where the driver sets the password in advance for the smartphone application or registers and stores the biological information in advance in the smartphone application, the driver may perform the authentication process. The smartphone application compares a password, a fingerprint, an iris, or a facial shape, which is input by the driver in the present authentication process, against that which is registered and stored in advance. When the information that is input is the same as that in the smartphone application, the smartphone determines that the driver is a registered proper user. Then, the authentication is completed.

When the authentication is completed, the smartphone 150 makes a connection to the vehicle 1 through Bluetooth communication (S13 and S14). Thus, the smartphone 150 is in a state of possibly communicating with the controller 110 of the vehicle 1 through the communication unit 130.

Subsequently, the smartphone application checks that a connection is established through the Bluetooth communication (S15) and then displays the screen for the setting mode (S16). When the driver selects a parameter change on the screen for the setting mode, the smartphone application makes a request to the controller 110 of the vehicle 1, which is connected to the smartphone 150, for the drivability data (an item-based parameter value) that is already set to be in the vehicle (S17 and S18).

At this time, the smartphone application's request to the controller 110 of the vehicle 1 for the information means that information on current vehicle fuel efficiency information (learned fuel efficiency and current fuel efficiency) for calculating the distance to empty (DTE) and information on the available energy of the battery are requested as well.

The controller 110 of the vehicle 1 makes a request to confirm whether or not data upload is approved (S19), through a display screen of the interface unit 120 (S19). Within the vehicle, the driver views this request through the display screen. Then, the driver selects or input data upload approval through an input unit of the interface unit 120.

The controller 110 of the vehicle uploads the existing drivability data through the communication 130, along with the information on the current vehicle fuel efficiency and the information on the available energy of the battery (S20), and the smartphone 150 receives the information on the current vehicle fuel efficiency, the information on the available energy of the battery, and the drivability data that are transmitted by the controller 110 of the vehicle 1 (S21).

Subsequently, a screen for selecting a mode for inputting a parameter value that the driver wants in order to make a change or an adjustment to a parameter value is displayed on the screen for the setting mode in the smartphone 150 (S22).

According to embodiments of the present invention, it is possible that one of a method of using an adjustment bar in the shape of a bar graph and a method of using a spider chart (also referred to as "raider chart") in the shape of a polygon is selected as an inputting method for performing the change and the setting to the parameter value.

When the driver selects the method of using an adjustment bar, for a change and an adjustment to the parameter value, an adjustment bar showing a current parameter value in the shape of a bar graph on a per-parameter item basis is displayed on the mode for the setting mode in the smartphone 150 (S23 and S24).

In contrast, when the driver selects the method of using a spider chart, for a change and an adjustment to the parameter value, a spider chart in which an apex of a polygon indicates a current parameter value on a per-parameter item basis is displayed on the mode for the setting mode in the smartphone 150 (S23 and S24').

FIGS. 7 to 10 illustrate a display state in the smartphone 150. A process of performing the change and the setting to the parameter value is described with reference to FIGS. 7 to 10.

The method of using an adjustment bar is illustrated on the upper portion of each of the figures. The method of using a spider chart is illustrated on the middle portion thereof. A display form of the finally-calculated distance to empty (DTE) is illustrated on the lower portion thereof.

The distance to empty (DTE) here is a value that is calculated from the parameter values that are shown on the adjustment bar or the spider chart on the upper portion of each of the figures. The calculation method is as described above with reference to FIG. 3.

FIG. 7 is a diagram illustrating a display state of the prior drivability data and distance to empty in the process of controlling the traveling characteristic of the vehicle according to the embodiment of the present invention. In FIG. 7, the initial drivability data that is downloaded from the vehicle in S21 in FIG. 5 after the smartphone is connected to the vehicle is illustrated.

FIGS. 8 and 9 are diagrams, each illustrating a state where the driver makes a change to a parameter and a display state of the distance to empty, in the process of controlling the traveling characteristic of the vehicle according to the embodiment of the present invention.

FIG. 8 illustrates that, based on the initial drivability data in FIG. 7, a change is made to a parameter value in the initial drivability data using the adjustment bar input method. As illustrated, a change is made to the parameter value that is indicated by the adjustment bar using a method in which the driver touches on an end portion (a circle-shaped button portion) with his/her finger and drags the end portion.

In addition, when a change is made to each parameter value that is indicated by the adjustment bar, a change is also made, in conjunction, to a value that is displayed in the spider chart on the lower portion, and a new value is accordingly displayed. The distance to empty is newly calculated and the adjusted distance to empty is displayed.

FIG. 9 illustrates that a change is made to the parameter value using the spider chart input method. As illustrated, the driver touches on an apex portion of a polygon that is the shape of the spider chart on the screen, with his/her finger and then drags the apex portion, a change is made to the parameter value that corresponds to the apex.

In addition, when a change is made to each parameter value that is indicated in the spider chart, a change is also made, in conjunction, to a value that is displayed by the adjustment bar on the upper portion and a new value is accordingly displayed. The distance to empty is newly calculated and the adjusted distance to empty is displayed.

In summary, in the setting mode according to embodiments of the present invention, the parameter value that is indicated by the adjustment bar on the upper portion is the same as the parameter value that is indicated in the spider chart on the lower portion. The distance to empty is calculated from the parameter value that is indicated by the adjustment bar and in the spider chart and the calculated distance to empty is displayed.

In FIGS. 7 to 10, the spider chart is illustrated in the shape of a pentagon having five apexes. This is for exemplification and does not impose any limitation to the present invention. The shape of the spider chart is changeable from a pentagon to various shapes, such as a hexagon or a tetrahedron, according to the number of parameters, the change and the setting to which is possibly performed.

The parameters to which the driver possibly makes the change are limited on the screen in the method of using a spider chart. For example, in examples in FIGS. 7 and 10, it is possible that a change is made to the parameter values of the maximum output (=the maximum motor torque), the feeling of acceleration (=the feeling of start and acceleration, the feeling of deceleration, and the responsiveness. However, a change cannot be made to at least two of the amount of regenerative braking, the air-conditioning limit mode, and the maximum speed limit.

In embodiments, in the examples in FIGS. 7 to 10, only in an input mode that uses the adjustment bar, it is possible that a change is made to at least two of the amount of regenerative braking, the air-conditioning limit mode, and the maximum speed limit. Therefore, when using the spider chart, the parameter values of at least two of the amount of regenerative braking, the air-conditioning limit mode, and the maximum speed limit, which results from previously performing the change and the setting using the adjustment bar remain unchanged.

In embodiments, although a change is made to the parameter values of the maximum output, the feeling of acceleration, the feeling of deceleration, and the responsiveness, when calculating the economical level and the distance to empty, the parameter values of at least two of the amount of regenerative braking, the air-conditioning limit mode, and the maximum speed limit, which result from previously performing the setting, are used without any change.

Of course, it is possible that the spider chart takes the shape of a polygon having more than five apexes in such a manner that all parameters can be displayed and a change can be made to all parameters. Furthermore, in the spider charts in FIGS. 7 to 10, it is possible that the economical level is replaced with any other parameter item.

For example, the parameter item that is indicated by the adjustment bar may be the same as the parameter that is indicated in the spider chart. At this time, the spider chart in the shape of a polygon having apexes of which the number is the same as the number of parameter items that are indicted by the adjustment bars are used.

However, an apex of a polygon in the spider chart indicates a parameter value, and therefore, according to embodiments of the present invention, when the economical level is included, at least two or more parameter values have to be used. According to embodiments of the present invention, if all parameters are displayed instead of displaying the economical level, at least three or more parameter values are used.

Then, in the examples in FIGS. 7 to 10, if the economical level is calculated from the parameter items other than the responsiveness, for example, from the maximum motor torque, the feeling of start and acceleration, the amount of regenerative braking, the air-conditioning limit mode, the maximum speed limit, and the responsiveness, in a case where an adjustment is made to the economical level in the spider chart, a change can be made to the amount of regenerative braking and the air-conditioning limit mode. Only the maximum speed limit can be changed to a value that corresponds to the adjusted economical level.

In embodiments, the amount of regenerative braking and the air-conditioning limit mode are parameter items to which a change is possibly made using only the adjustment bar. When the economical level is adjusted, the parameter values of the amount of regenerative braking and the air-conditioning limit mode maintains, which results from performing the setting using the adjustment bar, remains unchanged. Only the maximum speed limit is adjusted to a value that corresponds to the economical level that results from making the change, except for the maximum output, the feeling of acceleration, the feeling of deceleration, and the responsiveness. The adjusted maximum speed limit is indicated by the adjustment bar on the upper portion.

Of course, the economical level in the spider chart may be set to be in conjunction with the amount of regenerative braking instead of the maximum speed limit. In this case, the maximum speed limit and the air-conditioning limit mode are parameter items to which a change cannot be made in the spider chart and to which an adjustment can be made only by the adjustment bar.

In addition, the economical level in the spider chart may be set to be in conjunction with the air-conditioning limit mode. In this case, the maximum speed limit and the amount of regenerative braking are parameter items to which a change cannot be made in the spider chart and to which an adjustment can be made only by the adjustment bar.

In FIGS. 7 to 10, an adjustment bar input screen on the upper portion, a spider chart input screen on the middle portion, and a distance-to-empty display screen on the lower portion are all illustrated in one figure. However, screens are not necessarily displayed in this manner in the smartphone. Only one of the adjustment bar input screen, the spider chart input screen, and the distance-to-empty display screen is selected by the driver in the smartphone, and the selected screen is displayed.

FIG. 10 is a diagram illustrating a fixed display state of the parameter value that is transferred to the vehicle in the process of controlling the traveling characteristic of the vehicle according to the embodiment of the present invention and is applied to the vehicle.

With reference back to FIG. 6, if the driver, as described above, performs the change to the parameter value in S24 to S26 or S24' to S26' using the adjustment bar or the spider chart, the drivability data that results from making the change is transferred to the vehicle (S27), and, in the vehicle 1, the controller 110 receives the drivability data through the communication unit 130 (S28).

Subsequently, in a case where the vehicle stops and where a shift lever is positioned at a parking gear, the controller 110 applies the received drivability data to the control logic (S29 and S30).

In a flowchart in FIG. 6, in S30, it is illustrated that a vehicle controller receives the drivability data, from the control unit 110 and then the received drivability data to the control logic.

Thereafter, the controller 110 determines that the drivability data that contain the parameter values that are applied to the control logic are finally confirmed and makes a request to the smartphone to display the finally confirmed drivability data on the smartphone screen (S31). Accordingly, the final parameter values, as illustrated in FIG. 10, are confirmedly displayed on the smartphone screen and are stored (S32).

The process in which, in this manner, the driver performs the change and the setting to a parameter value for the vehicle that he/she is going to drive, using his/her smartphone is described above. However, FIG. 11 illustrates that the driver applies the drivability data that is stored in his/her smartphone, to another vehicle.

As illustrated in FIG. 11, the driver finishes driving the vehicle 1 and then may transfer the parameter values that are stored in his/her smartphone, to a vehicle 2. Thus, it is possible that the same parameter values as in the vehicle 1 are also applied to the vehicle 2.

At this time, in the vehicle 2, the traveling characteristic can be controlled according to the parameter values that result from making the change.

In this manner, the parameter values relating to the drivability and the traveling characteristic can be applied to the vehicle 2 in the same manner as in the vehicle 1. Thus, the same drivability (the driving sensation) and traveling characteristic as in the vehicle 1 can also be provided to the vehicle 2.

As described above, according to embodiments of the present invention, although a different vehicle is used, the drivability data that is desired by the driver can be applied to the different vehicle. This is advantageous in that in the different vehicle, the driver can also be provided in the same manner with the drivability and the traveling characteristic according to his/her preference.

In addition, it is possible that the driver uploads his/her drivability data to an external server for sharing with any other drivers. Conversely, the driver may make a connection to the external server through the Internet and may download the drivability data uploaded by any other driver for application to his/her vehicle.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

According to embodiments of the present invention, in this manner, there is an advantage that the drivability data is easy to change, set, apply, or share and that the vehicle easily provides the driver with his/her favorite drivability and traveling characteristic.

The embodiment of the present invention is described in detail above, and the scope of the present invention is not limited to this. Various modifications and improvements that use the basic concept of the present invention that is claimed in claims, which are made by a person of ordinary skill in the art, fall within the scope of the present invention.

Although the present invention has been described in conjunction with embodiments which illustrate the technical spirit of the present invention, it will be apparent to those skilled in the art that the present invention is not limited only to the illustrated and described configurations and operations themselves but variations and modifications are possible without departing from the scope of the spirit of the invention. Accordingly, all of appropriate variations, modifications and equivalents are considered to pertain to the scope of the present invention.

What is claimed is:

1. A device for controlling a traveling characteristic of a vehicle, the device comprising:
   a user terminal configured to configure and display a screen for a setting mode, on which one or more parameter values configured to determine drivability and a traveling characteristic of the vehicle is displayed and from which a driver performs a change and a setting to the displayed one or more parameter values;
   a controller provided in the vehicle, configured to receive a parameter value that results from the driver performing the change and the setting, from the user terminal, and further configured to apply the received parameter value to control logic for controlling a traveling state of the vehicle; and
   a communication unit configured to make a connection between the user terminal and the controller in such a manner that transmission and reception of a parameter value is possible,
   wherein the traveling state of the vehicle is controlled based on the parameter value that results from the user performing the change and the setting in the user terminal and is applied to the control logic, and thus the drivability and the traveling characteristic of the vehicle depending on the controlled traveling state are provided to the driver, and
   wherein the user terminal
      receives vehicle fuel efficiency and information on available energy of a battery that supplies electric power to a vehicle drive motor, from the controller,
      calculates a distance to empty (DTE) from the parameter value that results from the driver performing the change and the setting and from the vehicle fuel efficiency and the available energy of the battery that are received from the controller of the vehicle,
      displays the calculated DTE,
      calculates an economical level from the parameter value that results from the driver performing the setting,
      determines a fuel efficiency improvement rate that corresponds to the calculated economical level,
      calculates a compensation value of the DTE from the determined fuel efficiency improvement rate, the vehicle fuel efficiency, and the available energy of the battery, and
      corrects the calculated DTE using the compensation value of the DTE, and displays the corrected DTE, as a final DTE, on a display screen.

2. The device of claim 1, further comprising an additional controller configured to receive the parameter value that results from the driver performing the change and the setting, from the controller, to apply the parameter value to the control logic, and to control the traveling state of the vehicle according to the control logic to which the parameter value is applied.

3. The device of claim 1, wherein the one or more parameter values include at least one or several of parameter values of maximum motor torque, start and acceleration, deceleration, an amount of regenerative braking, an air-conditioning limit mode, a maximum speed limit, and responsiveness that determine the drivability and the traveling characteristic of the vehicle.

4. The device of claim 1, wherein the controller is configured to receive multiple parameter values that result from performing the setting for multiple parameters that determine the drivability and the traveling characteristic of the vehicle,
   wherein the multiple parameters include at least one or several of maximum motor torque, start and acceleration, deceleration, an amount of regenerative braking, an air-conditioning limit mode, a maximum speed limit, and responsiveness, and
   wherein the screen for the setting in the user terminal includes an adjustment bar that is configured to display and adjust the multiple parameter values in a shape of a bar graph, and a spider chart that is configured to display and adjust the multiple parameter values in a shape of a polygon.

5. The device of claim 1, wherein the user terminal calculates the compensation value of the DTE as a value that results from multiplying the determined fuel efficiency improvement rate, the vehicle fuel efficiency, and the available energy of the battery together.

6. The device of claim 1, wherein the controller is configured to multiple parameter values that result from performing the setting for multiple parameters that determine the drivability and the traveling characteristic of the vehicle,
wherein the user terminal calculates the economical level using at least one or several of, or all of the parameter values that result from performing the setting for the multiple parameters, and
wherein the multiple parameters include maximum motor torque, start and acceleration, deceleration, an amount of regenerative braking, an air-conditioning limit mode, a maximum speed limit, and responsiveness that determine the drivability and the traveling characteristic of the vehicle.

7. The device of claim 6, wherein the economical level is calculated as a value that results from
adding up a default value that is determined as a constant in order to set a lower limit value, and the parameter values of the parameters other than the responsiveness, which result from performing the setting for use in the calculation of the economical level, and
multiplying the result of the adding up by an index that corresponds to the parameter value of the responsiveness.

8. The device of a vehicle, of claim 1, wherein the user terminal displays the calculated economical level on the display screen.

9. The device of a vehicle, of claim 1, further comprising:
an external server that receives the parameter value that results from the driver performing the change and the setting, from the user terminal or the controller of the vehicle, wherein, in a case where the user terminal of the driver who performs the change and the setting to the parameter value, or a user terminal of a different driver makes a request, the external server transmits the stored parameter value to the user terminal that makes the request.

10. A method of controlling a traveling characteristic of a vehicle, the method comprising:
enabling a user terminal to make a connection to a controller of the vehicle through a communication unit;
enabling the user terminal to configure and display a screen for a setting mode, from which a driver performs a change and a setting to one or more parameter values configured to determine drivability and a traveling characteristic of the vehicle;
enabling the user terminal to receive information indicative of the one or more parameter values for performing the setting, from a controller of the vehicle and to display the received one or more parameter values on the screen for the setting mode;
enabling the user terminal to transmit at least one parameter value that results from performing the change and the setting, to the controller of the vehicle, when the change and the setting to the parameter value is performed from the screen for the setting mode;
enabling the controller of the vehicle to apply the parameter value that results from performing the change and the setting, which is received from the user terminal, to control logic for controlling a traveling state of the vehicle; and
controlling a traveling state of the vehicle according to the parameter value that is applied to the control logic and thus providing the drivability and the traveling characteristic of the vehicle according to the controlled traveling state to the driver,
wherein the user terminal further
receives vehicle fuel efficiency and information on available energy of a battery that supplies electric power to a vehicle drive motor, from the controller of the vehicle,
calculates a distance to empty (DTE) from the parameter value that results from performing the change and the setting from the screen for the setting mode and from the vehicle fuel efficiency and the available energy of the battery that are received from the controller of the vehicle,
displays the calculated DTE,
calculates an economical level from the parameter value that results from the driver performing the setting,
determines a fuel efficiency improvement rate that corresponds to the calculated economical level,
calculates a compensation value of the DTE from the determined fuel efficiency improvement rate, the vehicle fuel efficiency, and the available energy of the battery, and
corrects the calculated DTE using the compensation value of the DTE, and displays the corrected DTE, as a final DTE, on a display screen.

11. The method of claim 10, wherein the one or more parameter values include at least one or several parameter values of maximum motor torque, start and acceleration, deceleration, an amount of regenerative braking, an air-conditioning limit mode, a maximum speed limit, and responsiveness that determine the drivability and the traveling characteristic of the vehicle.

12. The method of claim 10, wherein the user terminal transmits multiple parameter values that result from performing the setting for multiple parameters that determine the drivability and the traveling characteristic of the vehicle,
wherein the multiple parameters include at least one or several of maximum motor torque, start and acceleration, deceleration, an amount of regenerative braking, an air-conditioning limit mode, a maximum speed limit, and responsiveness, and
wherein the screen for the setting in the user terminal includes an adjustment bar that is configured to display and adjust the multiple parameter values in a shape of a bar graph, and a spider chart that is configured to display and adjust the multiple parameter values in a shape of a polygon.

13. The method of claim 12, wherein when the change and the setting to one of the multiple parameter value is performed using the selected one of the adjustment bar and the spider chart, in conjunction with this, the other one of the adjustment bar and the spider chart displays another parameter value that results from performing the change and the setting.

14. The method of claim 10, wherein the economical level is calculated as a value that results from
adding up a default value that is determined as a constant in order to set a lower limit value, and the parameter values of the parameters other than the responsiveness, which result from performing the setting for use in the calculation of the economical level, and multiplying the result of the adding up by an index that corresponds to the parameter value of the responsiveness.

15. The method of claim 10, wherein the user terminal calculates the compensation value of the DTE as a value that results from multiplying the determined fuel efficiency improvement rate, the vehicle fuel efficiency, and the available energy of the battery together.

16. The method of claim 10, wherein the user terminal displays the calculated economical level on the display screen.

17. The device of claim 1, wherein the user terminal is a terminal in which software in which the driver performs the change and the setting to the parameter value relating to the drivability and the traveling characteristic of the vehicle is installed, or is a smart device in which an application for performing the change and the setting to the parameter value, which is downloaded by the driver, is installed.

18. The method of claim 10, wherein the user terminal is a terminal in which software in which the driver performs the change and the setting to the parameter value relating to the drivability and the traveling characteristic of the vehicle is installed, or is a smart device in which an application for performing the change and the setting to the parameter value, which is downloaded by the driver, is installed.

19. The device of claim 1, wherein the controller, the interface unit, and the communication unit are provided inside of the vehicle, except for the user terminal.

20. The method of claim 10, wherein the controller, the interface unit, and the communication unit are provided inside of the vehicle, except for the user terminal.

\* \* \* \* \*